United States Patent
Strohbehn et al.

(10) Patent No.: US 8,133,521 B2
(45) Date of Patent: *Mar. 13, 2012

(54) METHOD OF SEPARATING COMPONENTS OF TECHNICAL EGGS, EDIBLE EGGS, YOLK AND WHITES AND PRODUCTS THEREFROM

(75) Inventors: Ronald E. Strohbehn, Nevada, IA (US); Jesse I. Figgins, Ames, IA (US)

(73) Assignee: Biova, L.L.C., Johnston, IA (US)

( * ) Notice: Subject to any disclaimer, the term of this patent is extended or adjusted under 35 U.S.C. 154(b) by 1100 days.

This patent is subject to a terminal disclaimer.

(21) Appl. No.: 11/971,796

(22) Filed: Jan. 9, 2008

(65) Prior Publication Data

US 2008/0166447 A1 Jul. 10, 2008

Related U.S. Application Data

(60) Provisional application No. 60/884,145, filed on Jan. 9, 2007.

(51) Int. Cl.
| | |
|---|---|
| A23J 1/09 | (2006.01) |
| A23L 1/32 | (2006.01) |
| C07K 1/14 | (2006.01) |
| C07K 1/16 | (2006.01) |
| C07K 1/30 | (2006.01) |
| C07K 1/34 | (2006.01) |

(52) U.S. Cl. ........ 426/480; 426/614; 426/442; 530/412; 530/417; 530/420; 530/422

(58) Field of Classification Search .......... 426/480, 426/614, 442; 530/420, 422, 412, 417
See application file for complete search history.

(56) References Cited

U.S. PATENT DOCUMENTS

| 4,112,123 A | 9/1978 | Roberts |
| 4,330,446 A | 5/1982 | Miyosawa |
| 5,037,661 A * | 8/1991 | Merchant et al. ............... 426/47 |
| 5,367,054 A | 11/1994 | Lee |
| 5,399,331 A | 3/1995 | Loughrey |
| 2005/0176122 A1 | 8/2005 | Lihme et al. |
| 2006/0223986 A1 | 10/2006 | Chiou |

OTHER PUBLICATIONS

International Search Report, Biova, L.L.C., PCT/US08/50653 dated May 9, 2008, 1 page.
Search Report for co-pending PCT/US2008/050653 listing relevant art, May 9, 2008.

* cited by examiner

*Primary Examiner* — Rosanne Kosson
(74) *Attorney, Agent, or Firm* — McKee, Voorhees & Sease, P.L.C.

(57) ABSTRACT

The present invention relates to methods for the separation of various components from eggs. More particularly, the present invention relates to methods for the separation of proteins and lipids from eggs, including technical eggs (inedible) or edible eggs, yolks or whites, which comprises cross-linking the lipids of eggs with a cross-linking reagent. In an embodiment, the method includes separating the proteins from the cross-linked lipids. In an embodiment, the method includes the separation of various components associated with the cross-linked lipids. The methods disclosed herein allow for the isolation of multiple different components from the egg in an efficient, cost-effective manner without compromising the recovery process of the components or their subsequent utility in various applications or compositions. The compositions and isolated components obtained by the methods of the invention can be used in pharmaceutical, medical, nutritional, cosmetic or health applications.

16 Claims, 17 Drawing Sheets

METHOD OF SEPARATING COMPONENTS OF TECHNICAL EGGS, EDIBLE EGGS, YOLK AND WHITES AND PRODUCTS THEREFROM

CROSS-REFERENCE TO RELATED APPLICATIONS

This application claims priority under 35 U.S.C. §119 of a provisional application Ser. No. 60/884,145 filed Jan. 9, 2007, which application is hereby incorporated by reference in its entirety.

FIELD OF THE INVENTION

This invention relates to a process of recovery of components from whole eggs, technical or edible eggs, yolks or whites using various physical and chemical treatments and has particular but not exclusive application to their recovery from avian eggs.

BACKGROUND OF THE INVENTION

An avian egg, in general, comprises an eggshell, two eggshell membranes, and an egg white and an egg yolk. Both the egg white and the egg yolk contain nutritionally physiologically valuable components such as proteins, for instance ovalbumin, ovotransferrin, ovomucin, and others, as well as lipids. The egg white is known as the albumen (Latin, albus, for "white") and is comprised of four alternating layers of thick and thin albumen contain approximately 40 different proteins, which are the main components of the egg white in addition to water. The egg white is approximately two-thirds of the total egg's weight out of its shell with 90% of that weight coming from water. The remaining weight of the egg white comes from protein, trace minerals, fatty material, vitamins, and glucose. The U.S. large egg's white typically weighs 38 grams with 3.9 grams of protein, 0.3 grams of carbohydrate and 62 milligrams of sodium. The most predominant proteins and their approximate respective percentage of composition of the albumen include the following: Ovalbumin (54%), Ovotransferrin (12%), Ovomucoid (11%), Globulins (8%) (Function-Plugs defects in membranes, shell), Lysozyme (3.5%), Ovomucin (1.5%), Avidin (0.06%), and others (10%). There are also opaque ropes of egg white, called the chalazae, that hold the yolk in the center of the egg. They attach the yolk's casing to the membrane lining the eggshell. Additionally, there is a vitelline membrane, a clear casing that encloses the yolk.

The egg yolk makes up about 33% of the liquid weight of the egg, a majority of the calories contained in the egg, most of the minerals (iron, phosphorus, calcium, thiamine, and riboflavin) and virtually all of the fat soluble vitamins (A, D, E and K). The approximate composition (by weight) of the most prevalent fatty acids in egg yolk include: unsaturated fatty acids (Oleic acid (47%), Linoleic acid (16%), Palmitoleic acid (5%), Linolenic acid (2%)) and saturated fatty acids (Palmitic acid (23%), Stearic acid (4%), Myristic acid (1%)). The yolk is also a source of lecithin, a common emulsifier.

Each of the various egg components has utility in a variety of industries. Specifically, the egg component's utility spans across the food, nutraceutical, pharmaceutical and cosmetic industries. Egg powders are utilized in a variety of food applications. For example, egg yolk and whole egg powders and egg albumen powders are used in a variety of baked goods, mayonnaise, quiches and other food applications requiring whipping or binding of egg products. Additionally, the substitution of egg powders allows manufacturers to add additional nutritional value to the products. In nutraceutical, cosmetic and pharmaceutical applications, lysozyme, avidin and ovotransferrin can be extracted from the egg albumen. Such products can be utilized as natural antimicrobial (lysozyme), food preservatives in cheese and wine, a nutritional ingredient in iron-fortified products (Ovotransferin), as well as use in pharmaceuticals. Additionally, avidin may be used in biotechnology research for diagnostic kits.

An individual analysis of some of the egg's components follows, including some of particular commercial interest.

Ovotransferrin is a neutral glycoprotein synthesized in the hen oviduct and deposited in the egg white albumen at a ratio of approximately 12% of the total protein content. Ovotransferrin is an 80 kDa matrix covalent dimmer protein observed at high concentration in the uterine fluid at the initial stage of shell mineralization and is also present in extracts from demineralized eggshell, the sites of calcite nucleation. Northern blotting and RT-PCR demonstrate that ovotransferrin is expressed in the proximal oviduct, and at a lower magnitude in the distal oviduct. Ovotransferrin is also present in the tubular gland cells of the uterus. Ovotransferrin is also thought to impact calcium carbonate crystals and calcite morphology, suggesting that ovotransferrin has a dual role, a protein influencing nucleation and growth of calcite crystals and as a bacteriostatic filter to reinforce its inhibition of Salmonella growth in egg albumen.

Ovotransferrin can be used as a nutritional ingredient in iron-fortified products such as iron supplements, iron fortified mixes for instant drinks, sport bars and protein supplements and iron-fortified beverages. There is also extensive evidence of an antibacterial effect of ovotransferrin based on iron deprivation, iron being an essential growth factor for most micro-organisms. Ovotransferrin tightly binds transition metals (Fe[III], Cu[III], Al[III]) with a binding log constant of about 15 at pH 7.0 and higher. In vivo, ovotransferrin demonstrates therapeutic properties against acute enteritis in infants (Corda, R., et al., Conalbumen in the treatment of acute enteritis in the infant, Int. J. Tiss. Reac. V(1), 117-123 (1983)).

Ovalbumin is the main protein found in egg white, making up close to 60% of the total protein. The ovalbumin functions as nourishment and blocks digestive enzymes. It belongs to the serpin superfamily of proteins, although unlike the majority of serpins it is unable to inhibit any proteases. The ovalbumin protein of chickens is made up of 385 amino acids, and its relative molecular mass is 45 kDa. It is a glycoprotein with 4 sites of glycosylation. It is secreted from the cell, despite lacking an N-terminal leader sequence. The function of ovalbumin is unknown, although it is presumed to be a storage protein.

Ovalbumin is useful in cases of poisoning by heavy metals (such as iron) as a chelator to heavy metals by trapping the metal ions within the sulfhydryl bonds of the protein and preventing the absorption of the metals into the gastrointestinal tract and prevents poisoning. Additionally, it is an important protein in several different areas of research. Ovalbumin is commonly used in general studies of protein structure and properties. It is also utilized in studies of serpin structure and function (the fact that ovalbumin does not inhibit proteases means that by comparing its structure with that of inhibitory serpins, the structural characteristics required for inhibition can be determined). Ovalbumin is also used in proteomics, as a molecular weight marker for calibrating electrophoresis gels. Additionally, ovalbumin is utilized in immunology studies as a stimulator of allergic reactions in test subjects.

Lysozyme is a 14.4 kDa, 129 aminoacid residue enzyme that damages bacterial cell walls by catalyzing hydrolysis of 1,4-beta-linkages between N-acetylmuramic acid and N-acetyl-D-glucosamine residues in a peptidoglycan and between N-acetyl-D-glucosamine residues in chitodextrins. Large amounts of lysozyme can be found in egg whites and the eggshell, as originating from the uterine fluid. Lysozyme protein is highly concentrated in the limiting membrane circumscribing the egg white and forms the innermost layer of the shell membranes. It is also present in the shell membranes, and in the matrix of the calcified shell. Lysozyme provides anti-microbial protection as it digests bacterial cell walls and protective structural properties to an eggshell.

Lysozyme functions by attacking peptidoglycans (found in the cells walls of bacteria, especially Gram-positive bacteria) and hydrolyzing the glycosidic bond that connects N-acetyl-muramic acid with the fourth carbon atom of N-acetylglucosamine. It does this by binding to the peptidoglycan molecule in the binding site within the prominent cleft between its two domains. This causes the substrate molecule to adopt a strained conformation similar to that of the transition state. The lysozyme binds to a hexasaccharide and then distorts the 4th sugar in hexasaccharide (the D ring) into a half-chair conformation. In this stressed state the glycosidic bond is easily broken. The amino acid side chains glutamic acid 35 (Glu35) and aspartate 52 (Asp52) have been found to be critical to the activity of this enzyme. Glu35 acts as a proton donor to the glycosidic bond, cleaving the C—O bond in the substrate, whilst Asp52 acts as a nucleophile to generate a glycosyl enzyme intermediate. The glycosyl enzyme intermediate then reacts with a water molecule, to give the product of hydrolysis and leaving the enzyme unchanged. The amino acid side chains glutamic acid 35 (Glu35) and aspartate 52 (Asp52) have been found to be critical to the activity of this enzyme. Glu35 acts as a proton donor to the glycosidic bond, cleaving the C—O bond in the substrate, whilst Asp52 acts as a nucleophile to generate a glycosyl enzyme intermediate. The glycosyl enzyme intermediate then reacts with a water molecule, to give the product of hydrolysis and leaving the enzyme unchanged.

Lysozyme protein is abundant in the limiting membrane that circumscribes the egg white and forms the innermost layer of the shell membranes. It is also present in the shell membranes, and in the matrix of the calcified shell. Calcite crystals grown in the presence of purified hen lysozyme exhibited altered crystal morphology. Therefore, in addition to its well-known anti-microbial properties that could add to the protective function of the eggshell during embryonic development, shell matrix lysozyme may also be a structural protein which in soluble form influences calcium carbonate deposition during calcification.

Lysozyme is used in the food industry due to its ability to selectively inhibit the uncontrolled growth of Clostridium tyrobutyricum during the maturation of cheeses. Additionally, lysozyme can be used to protect against bacterial, viral or inflammatory diseases. It can be used as an aerosol for the treatment of bronchopulmonary diseases and for its prophylactic function against infectious pathogens of the buccal cavity, such as dental caries. It can further be used in droplets for nasal tissue protection and various therapeutic creams designed for the protection and topical reparation of certain diseases such as Herpes and shingles, as well as the treatment of recurrent aphthous stomatitis. Oral administration of lysozyme has also been shown to have immunostimulation effects in addition to antihistamine effects.

Various proteins are contained within eggs, including TGF-β and IgF-1. Transforming growth factor beta (TGF-β) is a protein having three isoforms (TGF-β1, TGF-β2 and TGF-β3). It is synthesized in a wide variety of tissues. The TGF-β family is part of a superfamily of proteins known as the transforming growth factor beta superfamily, which includes inhibins, activin, anti-müillerian hormone, bone morphogenetic protein, decapentaplegic and Vg-1. TGF-β controls proliferation, differentiation, and other functions in most cell types. It can also act as a negative autocrine growth factor. TGF-β induces apoptosis in numerous cell types and therefore plays a crucial role in the regulation of the cell cycle.

Insulin-like growth factors (IGFs) are polypeptides with high sequence similarity to insulin. They are part of a complex system cells use to communicate with their physiologic environment, consisting of two cell-surface receptors (IGF1R and IGF2R), two ligands (IGF-1 and IGF-2), a family of six high-affinity IGF binding proteins (IGFBP 1-6), as well as associated IGFBP degrading enzymes, known as proteases. Most cells are affected by IGF-1, especially cells in muscle, cartilage, bone, liver, kidney, nerves, skin, and lungs. In addition to the insulin-like effects, IGF-1 can also regulate cell growth and development, especially in nerve cells, as well as cellular DNA synthesis. IGF-2 is secreted by the brain, kidney, pancreas and muscle in mammals and birds.

Transfer factors are immune messenger molecules found in all higher animals. They are found in white blood cells, colostrum, and eggs. They transfer immunity against many pathogens that would otherwise kill the offspring of a species. They derive from leukocyte lysates of immune donors which can transfer strong local and systemic cellular immunity to non-immune recipients. Transfer factors could be utilized to immunity between compatible sources. They can be utilized by one prone to illness, i.e., colds, sore throats, ear infections, influenza, and numerous other ailments and diseases, in place of conventional commercially available immune boosters, preventions or treatments.

Sialic acids are a group of naturally occurring N- and O-acyl derivatives of the deoxyamino sugar neuraminic acid. Sialic acid consists of acetylated, sulfated, methylated, and lactylated derivatives and is a large family of more than 50 members. They are ubiquitously distributed in many animal tissues and in bacteria, primarily in glycoproteins and gangliosides. They are typically the terminal residues on cell surface oligosaccharides. Sialic acid-rich glycoproteins bind selectin in humans and other organisms. Sialic acid is also naturally occurring in eggs.

Sialic acid is useful as a pre-cursor to many anti-inflammatory medications. Various pharmaceutical agents and diagnostic reagents for influenza viruses are used in medical fields, leading to an increased demand for larger amounts of sialic acid worldwide.

Arachadonic acid is an omega-6 fatty acid, unsaturated, essential fatty acid, found in egg yolks. Arachadonic acid is a desirable product, because unlike the bad fats such as saturated fatty acids and cholesterol, arachadonic acid is a good fat, essential to stay healthy. Essential fatty acid deficiencies can lead to reduced growth, inability to fight infections and infertility. Although arachadonic acid deficiencies are not extremely common in the United States, they do exist in greater prevalence throughout the world. Arachadonic acid is needed to strengthen cell membrane integrity, repair cellular and tissue damage, optimize neurological transmission and brain function, improve heart and circulatory function and produce supple, moist skin. Therefore, obtaining a source of arachadonic acid from eggs could be used in numerous forms to provide supply for the human body to use to synthesize regulatory molecules such as prostaglandins (hormone like chemical messenger) and thromboxanes (involved in platelet aggregation and blood clotting).

Lipoproteins are globular, micelle-like particles that consist of a non-polar core of acylglycerols and cholesteryl esters, surrounded by an amphiphilic coating consisting of protein, phospholipid and cholesterol. Lipoproteins have been classified into five broad categories on the basis of their functional and physical properties: chylomicrons (which transport dietary lipids from intestine to tissues), very low density lipoproteins (VLDL), intermediate density lipoproteins (IDL), low density lipoproteins (LDL), (all of which transport triacylglycerols and cholesterol from the liver to tissues), and high density lipoproteins (HDL) (which transport endogenous cholesterol from tissues to the liver).

Lipoprotein particles undergo continuous metabolic processing and have variable properties and compositions. Lipoprotein densities increase without decreasing particle diameter because the density of their outer coatings is less than that of the inner core. The protein components of lipoproteins are known as apolipoproteins. High concentrations of lipoproteins in the diet are strongly associated with increased risk of cardiovascular disease, including increased risk for atherosclerosis and its manifestations, which include hypercholesterolemia, myocardial infarction, and thrombosis.

Carotenoids are naturally occurring organic pigments. Carotenoids are found in abundance (over 600 types) in nature and are divided into two classes: xanthophylls and carotenes. The xanthophylls include lutein and zeaxanthin, both naturally occurring in eggs. The yellow color of chicken egg yolks is a result of ingested xanthophylls. In fact, eggs are one of the richest natural resources containing carotenoids. Carotenoids have a number of important physiological properties and are often formulated into a variety of therapeutic drugs or nutritional supplements.

The carotenoids, lutein and zeaxanthin have a yellow color, as seen in an egg yolk, because they absorb the high-energy radiation of the near-ultraviolet and blue light spectrum and reflect the yellow/yellow-orange wavelengths. It is theorized that since these two pigments absorb wavelengths in the high-energy spectrum, they may help protect retinal cells in the macula against "phototoxic" damage caused by short-wavelength high-energy light radiation. Additionally, lutein and zeaxanthin are chemically very closely related to each other; both have the exact same chemical formulae, differing only in their ring stereochemistry and the spatial placement of one end ring and the placement of a double bond in that end ring Lutein is classified as a carotenoid and is one of many nutrients naturally occurring in egg yolks, and in part provides the yellow color of the egg yolk. It has a variety of important physiological properties, including prevention of age-related macular degeneration, a gradual worsening of vision due to degeneration of a portion of the retina and one of the leading causes of blindness, as well as decreasing the development of cataracts within the eye. Lutein assists in protecting eyes from oxidative stress and high-energy light damage. Although there are no daily recommended amounts of lutein, there is a demand for lutein in many diets as individuals seek to increase lutein consumption in their diets through lutein-fortified foods, sublingual sprays and dietary supplements, including both nutraceuticals and pharmaceuticals. Additionally, lutein is utilized within pet food markets and human skin care and cosmetics.

Zeaxanthin is a carotenoid found in egg yolks providing its yellow color. It can be used as a feed additive, a colorant in the cosmetic and food industries, and dietary supplements. Zeaxanthin has a variety of important physiological properties, including prevention and treatment of age-related macular degeneration, to which there is no cure and treatments are currently limited, as well as decreasing the risk of cataract development. Other carotenoids, such as beta-carotene, vitamin A, and vitamin E have generally been used and seen as beneficial anti-oxidant that may slightly retard the rate of macular degeneration. However, they fail to rise to the level of truly effective treatments. Zeaxanthin is not a widely available chemical, and is not available to the public except in extremely small trace quantities in mixtures of other less beneficial carotenoids.

Typical methods of separating components from avian eggs include diluting the egg yolks and whites with water at a pH from about 4-5 so that the lipids separate out of solution. One disadvantage of this dilution technique can be its lack of efficiency since the lipids have to settle out of solution overnight on their own. Centrifugation is not possible as it would stir up the lipids and hinder the separation of proteins from the solution. Further, with this type of processing, it can be difficult to obtain a high yield of proteins. The known technique is also disadvantageous in that only one protein of the egg, IgY, is isolated and the rest of the egg material discarded, rendering the process time-consuming, economically inefficient, and wasteful.

Thus, although it is generally recognized that eggs contain numerous nutritionally and physiologically or otherwise valuable components, problems remain, particularly with respect to recovery of such components in efficient and cost-effective ways without damaging the components or compromising their suitability of the components for use in nutritional, medicinal, pharmaceutical, health, cosmetic or related uses.

BRIEF SUMMARY OF THE INVENTION

In one embodiment, the invention provides a method of separating a protein from an egg mixture having lipids and proteins. The method includes adding a cross-linking reagent to the egg mixture comprising lipids and proteins to obtain cross-linked lipids. In another aspect, the method may include adjusting the pH level of the egg mixture to a pH at which the cross-linking reagent is functional so that cross-linking of the lipids occurs. The proteins are separated from the cross-linked lipids to provide a separated protein. According to the invention, the separated proteins may be obtained by subjecting the egg mixture to one or membranes or filters of various sizes to separate or further isolate proteins or populations of proteins of interest. The egg mixture may include a technical egg, edible egg, egg yolk, an egg white, or combination thereof.

In another embodiment, the invention provides a number of protein compositions prepared by the methods of the invention. In one aspect, the protein compositions are substantially lipid-free. The protein composition may include any of the following proteins: albumin, ovotransferrin, beta-livetin (alpha-2-glycoprotein), gamma livetin (IgY), insulin-like growth factor-1 (IGF-1), IGF-1, TGF-beta, transfer factors, lysozyme or phosvitin or combinations thereof. In yet another embodiment, the invention provides for a protein composition that is at least 10%, 15%, 20%, 25%, 30% 35, 40%, 45%, 50%, 55%, 60%, 65%, 70%, 75%, 80%, 85%, or 90% protein per weight of the composition. The protein compositions may include 5%, 10%, 15%, 20%, 25%, 30% 35, or 40% ovotransferrin. The protein compositions may include 5%, 10%, 15%, 20%, 25%, 30% 35, 40%, 45%, 50%, 55%, 60%, 65%, 70%, 75%, 80%, 85% or 90% albumin. In another aspect, the protein composition may include at least 10%, 20%, 30%, 40% or 50% polypeptides that are about less than 100 kDa. In one aspect, the protein composition includes 10%, 15%, 20%, 25%, 30% 35, 40%, 45%, 50%, 55%, 60%, 65%, 70%, 75%, 80%, 85% or 90% lysozyme.

The present invention provides a method for treating an individual in need of protein or amino acids. The individual may be an athlete, body-builder, weight-lifter, pregnant individual, individual recovering from surgery, trauma, or illness, or a diabetic individual. In other cases, the individual is an animal. The method includes administering to an animal or human a protein composition of the present invention. Also provided is a beverage, food or nutritional product including any of the protein compositions of the present invention.

Therefore it is a primary object feature or advantage of the present invention to improve over the state of the art.

A further object, feature, or advantage of the invention is to provide a novel method for the separation of proteins from a whole egg, yolk or white.

Another object, feature, or advantage of the invention is to provide a method for the separation of proteins from a whole egg, yolk or white that produces a protein composition that can be used in medical, health and cosmetic applications.

Still another object, feature, or advantage of the invention is to provide a method for the separation of proteins from a whole egg, yolk or white that produces a protein composition that is lipid free or substantially lipid free.

A further object, feature, or advantage of the invention is to provide a method for the separation of proteins from a whole egg, yolk or white that produces a protein composition that contains natural anti-microbials.

Yet another object, feature, or advantage of the invention is to provide a method for the separation of proteins from a whole egg, yolk or white that produces a protein composition of high purity.

Another object, feature, or advantage of the invention is to provide a method for the separation of proteins from a whole egg, yolk or white that produces a protein composition that with minimal salt (ash) content of the protein composition.

Still another object, feature, or advantage of the invention is to provide a method for the separation of proteins from a whole egg, yolk or white that produces a protein composition that has biologically active proteins.

Yet another object, feature, or advantage of the invention is to provide an efficient method for the separation of proteins from a whole egg, yolk or white that increases the yield of the protein.

It is a primary object feature or advantage of the present invention to improve over the state of the art.

A further object, feature, or advantage of the invention is to provide a novel method for the separation of proteins, lipoproteins, lipids, carotenoids, and fatty acids or combinations thereof from lipids of a whole egg, yolk or white.

Another object, feature, or advantage of the invention is to provide a method for the separation of proteins, lipoproteins, lipids, carotenoids, and fatty acids or combinations thereof from lipids of a whole egg, yolk or white that produces a composition that can be used in medical, health, nutritional, pharmaceutical and cosmetic applications.

Still another object, feature, or advantage of the invention is to provide a method for the separation of proteins from lipids of a whole egg, yolk or white that produces a protein composition that is lipid free or substantially lipid free.

A further object, feature, or advantage of the invention is to provide a method for the separation of proteins from lipids of a whole egg, yolk or white that produces a protein composition that contains natural anti-microbials.

Yet another object, feature, or advantage of the invention is to provide a method for the separation of proteins from lipids of a whole egg, yolk or white that produces a protein composition of high purity.

Another object, feature, or advantage of the invention is to provide a method for the separation of proteins from lipids of a whole egg, yolk or white that produces a protein composition that with minimal salt (ash) content of the protein composition.

Still another object, feature, or advantage of the invention is to provide a method for the separation of proteins from lipids of a whole egg, yolk or white that produces a protein composition that has biologically active proteins.

Yet another object, feature, or advantage of the invention is to provide an efficient method for the separation of proteins from lipids of a whole egg, yolk or white that increases the yield of the protein.

A further object, feature, or advantage of the invention is to provide a method for the separation of carotenoids from lipids of a whole egg, yolk or white that produces a carotenoid composition that contains luteins and zeaxanthins.

Yet another object, feature, or advantage of the invention is to provide a method for the separation of carotenoids from lipids of a whole egg, yolk or white that produces a carotenoid composition that is bioavailable.

Yet another object, feature, or advantage of the invention is to provide an efficient method for the separation of carotenoids from lipids of a whole egg, yolk or white that increases the yield or recovery of the carotenoids.

A further object, feature, or advantage of the invention is to provide a method for the separation of fatty acids from a whole egg, yolk or white to produce a lipid extract that contains fatty acids.

Yet another object, feature, or advantage of the invention is to provide a method for the separation of fatty acids from a whole egg, yolk or white to produce a lipid extract that contains fatty acids of sialic acid and arachadonic acid.

Other objects, features, advantages and aspects of the present invention will become apparent to those of skill from the following description. No single embodiment need exhibit all or any of the stated objects, features, advantages and aspects of the present invention. It should be understood, however, that the following description and the specific examples, while indicating preferred embodiments of the invention, are given by way of illustration only. Various changes and modifications within the spirit and scope of the disclosed invention will become readily apparent to those skilled in the art from reading the following description and from reading the other parts of the present disclosure.

BRIEF DESCRIPTION OF THE FIGURES

The invention can be more fully understood from the following detailed description and the accompanying figures.

FIG. 3 is a series of flow chart for one embodiment of separating various components from an egg.

DETAILED DESCRIPTION

The present invention now will be described more fully hereinafter with reference to the accompanying examples, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Many modifications and other embodiments of the invention set forth herein will come to mind to one skilled in the art to which this invention pertains, having the benefit of the teachings presented in the descriptions and the drawings herein. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The articles "a" and "an" are used herein to refer to one or more than one (i.e., to at least one) of the grammatical object of the article. By way of example, "an element" means one or more than one element. The disclosure of each reference set forth herein is incorporated herein by reference in its entirety.

This invention relates in part to a novel process for the recovery of various components from an egg. The invention has particular but not exclusive application to the separation and recovery of these components from an avian egg, e.g. hen egg. As used herein, the term "egg" refers to any edible egg or technical egg or part thereof including, but not limited to whole eggs, egg yolks, or egg whites or combinations thereof. Technical eggs include eggs that are broken or otherwise not fit for consumption because they include contaminants, e.g. from wash water or manure. The term "egg" also includes the egg in its various forms, for example, raw or dried. The egg may be obtained from any number of resources, including an egg-breaking facility.

Figure 1:
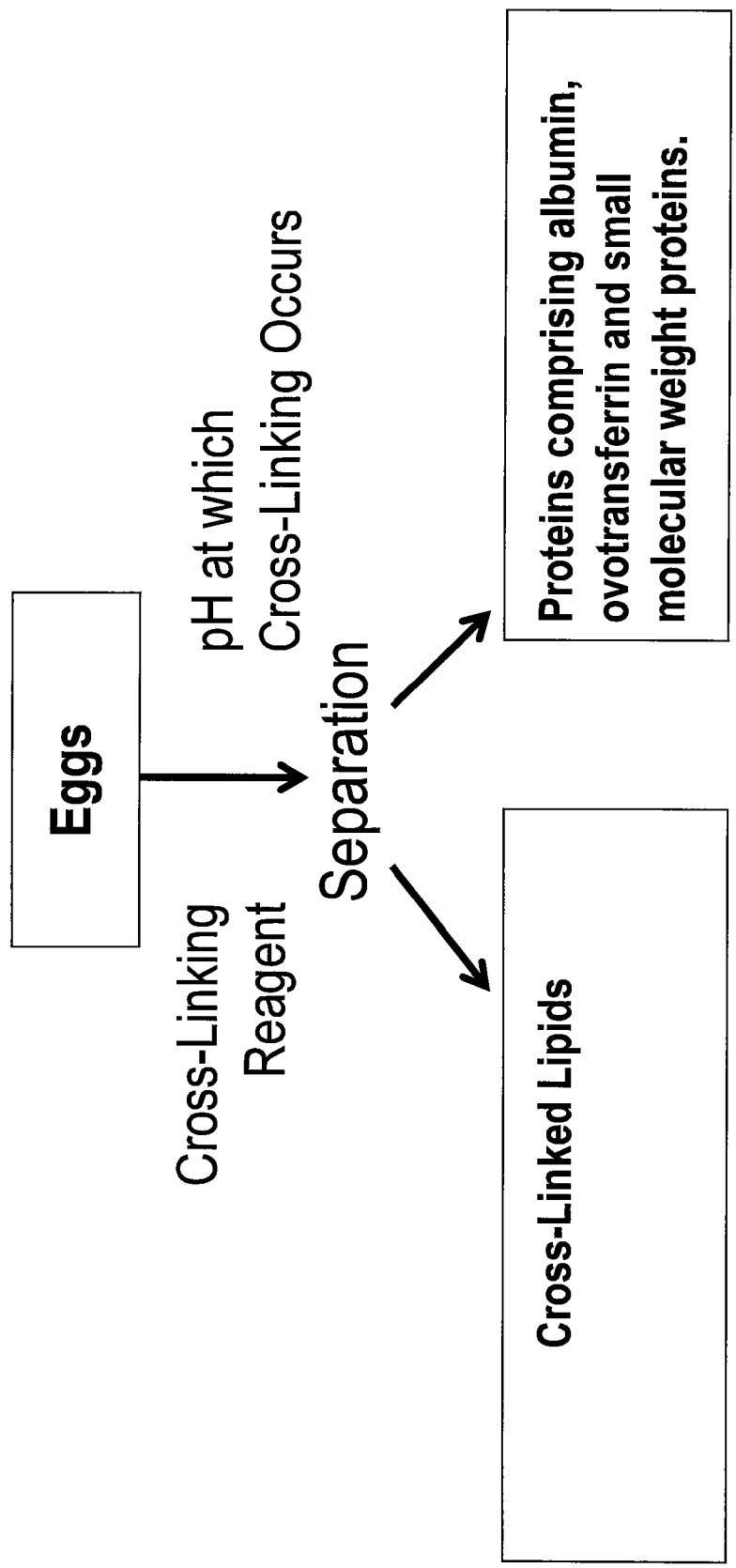
FIG. 1 is a flow chart for one embodiment of separating proteins and lipids from an egg.

Referring now to FIG. 1 there is shown, in a flow-chart format, an embodiment of the present invention, a method of separating lipids of an egg mixture from proteins of the egg mixture by cross-linking the lipids to obtain cross-linked lipids. The present invention includes methods of separating the cross-linked lipids from the proteins in the egg mixture, methods of separating proteins from the egg mixture and if desired, further isolating and purifying them, as well as methods of separating various components from the cross-linked lipids.

In one embodiment, the method may include separating proteins from the egg mixture by adding a cross-linking reagent to the egg mixture and adjusting the pH of the egg mixture to optimize cross-linking. This allows for the reagent to cross-link lipids present in the egg mixture. The cross-linked lipids may be easily removed from the solution for further processing and to facilitate the isolation of proteins solubilized in the egg mixture. The solubilized proteins may be separated from the cross-linked lipids using any suitable technique, and the solubilized proteins may be further isolated or processed as described elsewhere herein. Solubilized proteins initially separated from the cross-linked lipids include but are not limited to ovotransferrin, albumin, beta-livetin (alpha-2-glycoprotein), gamma livetin (IgY), insulin-like growth factor-1 (IGF-1), or phosvitin or combinations thereof. The methods disclosed herein may use various physical and chemical treatments for the separation and purification of the proteins.

In one embodiment, the invention includes separating various components associated with the cross-linked lipids and if desired, further isolating and purifying them. The components associated with the cross-linked lipids may include but are not limited to proteins, lipoproteins, lipids, carotenoids, and fatty acids, in particular TGF-beta, transfer factors, lysozyme, albumin, ovotransferrin, lipids such as triglycerides, cholesterol, phospholipids, lipoproteins, such as HDL (alpha lipovitellin), LDL (beta-lipovitellin), VLDL (apovitellenins), and fatty acids, such as sialic acid, Arachadonic acid, or carotenoids, such as lutein and zeaxanthin.

With respect to the separation of various components associated with the cross-linked lipids, the methods disclosed herein may use various physical and chemical treatments. For example, embodiments of the present invention may use a solution or a solvent or a combination of solutions and solvents to aid in the separation of a particular component from the cross-linked lipids. As shown in FIG. 3, this may involve the adjustment of the pH of the solution. In one embodiment, subsequent to the cross-linking of the lipids, a saline solution may be used to facilitate the release of proteins from the cross-linked lipids. Typically, the pH of the saline solution does not need to be readjusted from the pH of the previous solution, e.g. the egg mixture having its pH optimized for lipid cross-linking. In another embodiment, the pH of the solution is adjusted to a pH from about 2.0 to about 4.0 to facilitate the release of proteins from the cross-linked lipids. In some embodiments, the pH of the solution may be adjusted to about 2.0 to about 4.0 subsequent to contacting the cross-linked lipids with the saline solution or subsequent to the initial step of cross-linking the lipids. Without wishing to be bound by this theory, it is believed that the change in pH allows for the release of additional proteins by overcoming protein-protein interactions or protein-lipids interactions. In another embodiment, subsequent to contacting the cross-linked lipids with a solution having a pH from about 2.0 to about 4.0, the pH of the solution is adjusted to a pH from about 4.0 to about 6.0 to further facilitate the separation of the proteins. Without wishing to be bound by this theory, it is contemplated that the change in pH aids in the proteins' solubility.

Various process steps have been disclosed and the methods of the invention allow a number of different products to be obtained from the egg mixture, e.g. solubilized proteins, or the cross-linked lipids or a combination of both. The present invention contemplates that some process steps may be omitted, where not all products need be recovered. One of the advantages of the overall process is that multiple useful products may be obtained due to the sequencing or order of steps, which reduces the amount of waste materials. In addition, the sequencing or order of steps also provides for synergistic results in that the time and cost of producing additional products is less than producing each of the products in a separate process. In other words, only incremental process are needed to produce additional products.

Use of the methods disclosed herein allows for the isolation of multiple different components from an egg in an efficient, cost-effective manner without compromising the recovery process of the components or their subsequent utility in various applications or products and compositions. Advantageously, the methods of the invention result in various products and compositions which are free from impurities. In particular, the methods result in products and compositions which serve as a safe source of nutritional supplements for human consumption. Unlike other methods used for processing the egg, toxic solvents, or other unsafe materials need not be used in the methods of the invention or are not found in the resulting product, e.g. the isolated egg component or composition. The various compositions or components isolated thereof may be used in any number of applications, including but not limited to products or services in the food, nutrition, pharmaceutical, cosmetic, health and related industries.

I. Cross-Linking Lipids from the Egg Mixture

In one embodiment, the methods of the present invention include adding a cross-linking reagent to an egg mixture comprising lipids and proteins to obtain cross-linked lipids. As used herein, the term "mixture" refers to a composition of matter having two or more components in varying proportions, regardless of their physical state. The term "egg mixture" refers to a composition of matter having two or more components in varying proportions, regardless of their physical state, one of the components being an egg. As such an "egg mixture" includes the egg in its various parts or forms in combination with a solution or a solvent to form a solution or suspension. For example, the egg may be raw, solid, or dried prior to its addition to the solution or solvent. Typically, the egg mixture is a technical egg, edible egg, whole egg, egg yolk or egg white mixed or diluted with a solution, e.g. water, saline solution, or a solution having a pH suitable for cross-linking lipids of an egg. The ratio of egg to solution in the mixture is typically based on a measurement of an egg solid with moisture removed using IR32 moisture analyzer (Denver Instruments, Denver, Colo.). As an example, the percent solids of technical eggs with moisture removed is about 11% and a ratio of 1 part egg to 5 parts water, a 1:5 ratio, is used. With respect to whole eggs, the percent solids of whole eggs with moisture removed is about 23% and a ratio of 1 part egg to 7-10 parts water, a 1:7 or 1:10 ratio, is used. The dilution of the egg with the solution assists in the separation and isolation of various egg components.

Any suitable cross-linking reagent may be used so long as it is able to cross-link lipids. As used herein, the term "cross-linking" refers to aggregating lipids by hydrophobic interaction or adsorping of lipids. As used herein, the term "cross-linking reagent" refers to a material that can be used to cross-link a lipid, e.g. form an aggregate of lipids or adsorb lipids. Exemplary cross-linking reagents include but are not limited to cyclobetadextran, silicon dioxide, colloidal silica material, such as an acid stabilized dispersion of colloidal silica particles (e.g. Nalco-1042, Nalco-1130, Nalco-1115, Nalco-1030, Nalco-1140, Nalco-2326, Nalco-1050, Nalco-1060, and Nalco-2327, all available from Nalco Chemical Co), AEROSIL™ (Degussa A G, Parsippany, N.J.), and fumed silica materials, such as Synthetic Amorphous Silicon Dioxide, Crystalline-free fumed silica (e.g. Cab-O-Sil available from Cabot Corporation), Wacker HDK, (Wacker Chemie AG (Nünchritz, Germany), AEROSIL 380 (Degussa A G, Parsippany, N.J.), Synthetic Amorphous Silicon Dioxide, Crystalline-free precipitated silica (e.g. Hi-Sil available from PPG Industries), SIPERNAT®-50 and SIPERNAT®-180 available from Degussa A G, Parsippany, N.J.), and Synthetic Calcium Silicate Hydrate (e.g. LRA™ agent available from (Advanced Minerals, Goleta, Calif.). In one aspect, the cross-linking reagent is self-catalyzing.

Any percentage of cross-linking reagent that can cross link the lipids in the egg mixture may be used. In one aspect, the cross-linking reagent comprises from about 0.1% to about 20% by weight of the egg mixture. Preferably, the cross-linking reagent comprises from about 6% to about 10% by weight of the egg mixture. In a preferred aspect, the cross-linking reagent comprises from about 3% to about 6.0% of Nalco-1115 per weight of 20% egg mixture is employed.

In one embodiment, the method of the present invention includes adjusting the pH of the egg mixture to a pH range or level at which the cross-linking reagent is functional, for example, a pH where the cross-linking reagent can cross-link at least 25% of the lipids in the egg mixture. In one embodiment, the method of the present invention includes adjusting the pH of the egg mixture to optimize cross-linking. In one aspect, the pH of the mixture is adjusted to a pH from about 4.0 to about 8.0, for example, by contacting the egg mixture with an acidic solution. The egg mixture is subjected to the cross-linking reagent for a sufficient time at a sufficient temperature for cross-linking of the lipids in the egg mixture to occur. In some cases, this may be as little as fifteen minutes. Typically, the cross-linking reaction is carried out at room temperature. As apparent to one skilled in the art, the time, temperature, and the pH range at which to optimize cross-linking may vary depending on the specific cross-linking reagent employed. Such variations are well within one skilled in the art. An example of typical conditions include carrying out the cross-linking reaction for about 30 minutes to about 1 hour at a temperature of about 14° C. to about 37° C. at a pH from about 4.0 to about 8.0, more preferably from about 6.0 to about 7.5. Any suitable acid or base may be used to adjust the pH including but not limited to acetic acid, boric acid, citric acid, hydrochloric acid, lactic acid, oxalic acid, sulfuric acid, sulfurous acid, sodium hydroxide or potassium hydroxide.

In an embodiment of the invention, the method may include separating the cross-linked lipids from the egg mixture. The cross-linking step facilitates the precipitation of the cross-linked lipids from the egg mixture which allows for them to be easily removed by known techniques, such as precipitation; sedimentation; centrifugation; decantation; particulate filtration; membrane filtration; temperature modification; liquid-liquid extraction; and the like and combinations thereof. In one aspect, centrifugation is employed to generate a supernatant comprising solubilized proteins from the egg mixture and a precipitate comprising the cross-linked lipids. The supernatant may be collected and the precipitate comprising the cross-linked lipids removed. The precipitate comprising the cross-linked lipids may be removed for further processing as described elsewhere herein.

II. Separating the Solubilized Proteins from the Supernatant

In an embodiment of the invention, the method may include separating the solubilized proteins from the egg mixture from which the cross-linked lipids have been removed. Such solubilized proteins include but are not limited to ovotransferrin, albumin, beta-livetin (alpha-2-glycoprotein), gamma livetin (IgY), insulin-like growth factor-1 (IGF-1), or phosvitin or combinations thereof. As used herein, the term "albumin" is also used interchangeably with the term "ovalbumin" and alpha-livetin.

Figure 2:
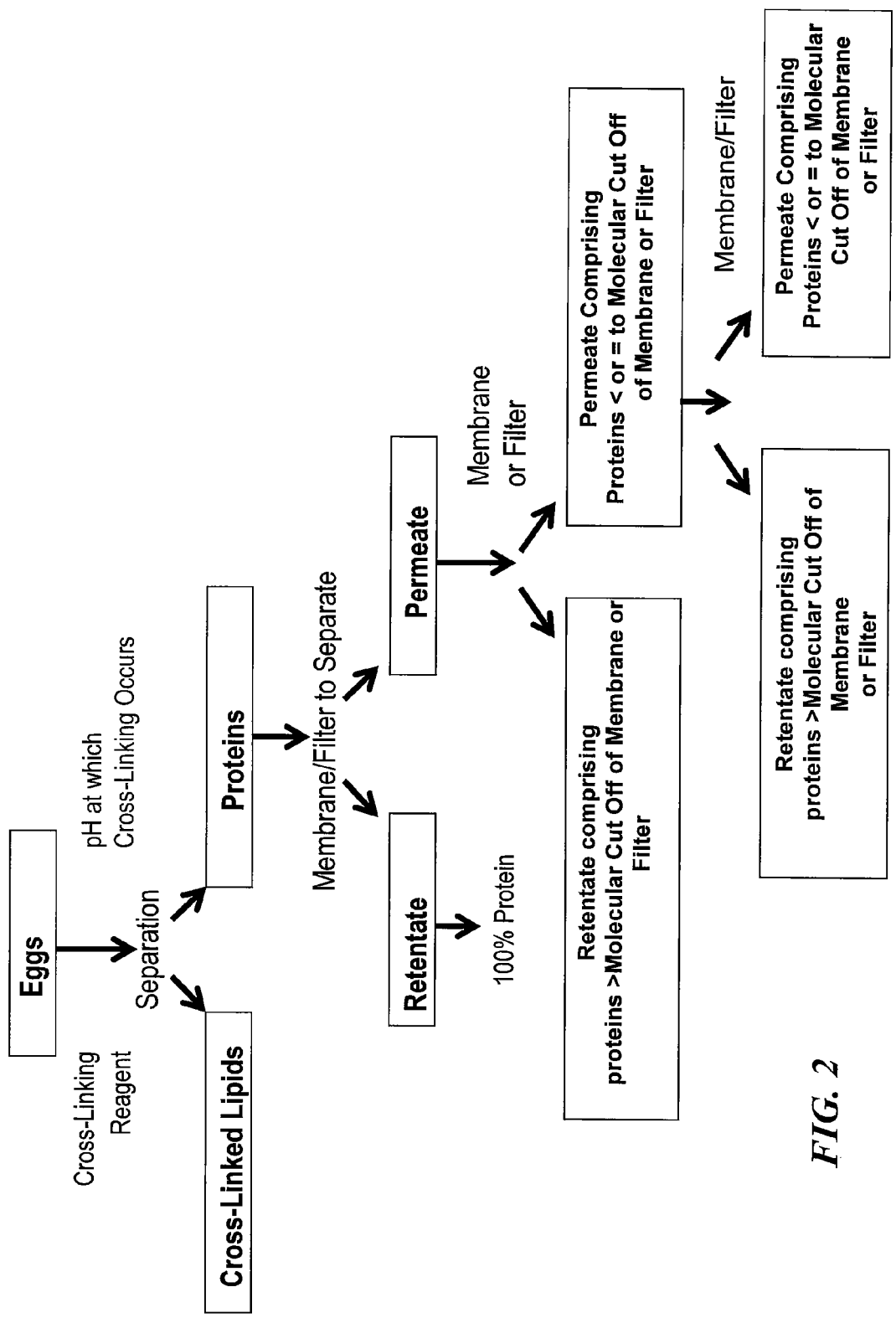
FIG. 2 is a flow chart for one embodiment of separating proteins of various sizes from an egg.

The solubilized proteins from the egg mixture may be concentrated, for example, using a 3 kDa membrane, to produce a protein composition in aqueous form. In an embodiment of the invention, as shown in FIG. 2, the method may include subjecting the concentrated proteins to one or more membranes or filters of various sizes to isolate specific proteins or populations of proteins of a desired size or molecular weight as described elsewhere herein. The resulting protein composition may be further purified by removing salt using routine techniques such as dialysis. Accordingly, the protein composition resulting from the method of the present invention may have minimal salt. As used herein, the term "minimal salt" refers to a composition or an egg mixture containing less than 2.0%, less than 1.0%, or less than 0.5% of salt. The protein compositions of the present invention may be prepared in any number of forms or formulations. In one aspect, the protein is prepared as a protein powder using any suitable technique, including but not limited to lyophilization, vacuum drying, freeze drying, spray drying, drum drying, paddle-drying, super critical fluid processing, air drying, or other forms of evaporative drying. The drying step may be carried out any suitable temperature, for example, with respect to freeze drying, a preferred temperature range is from about 23° C. to about 40° C., with 27° C. being the more preferred temperature.

Figure 4:
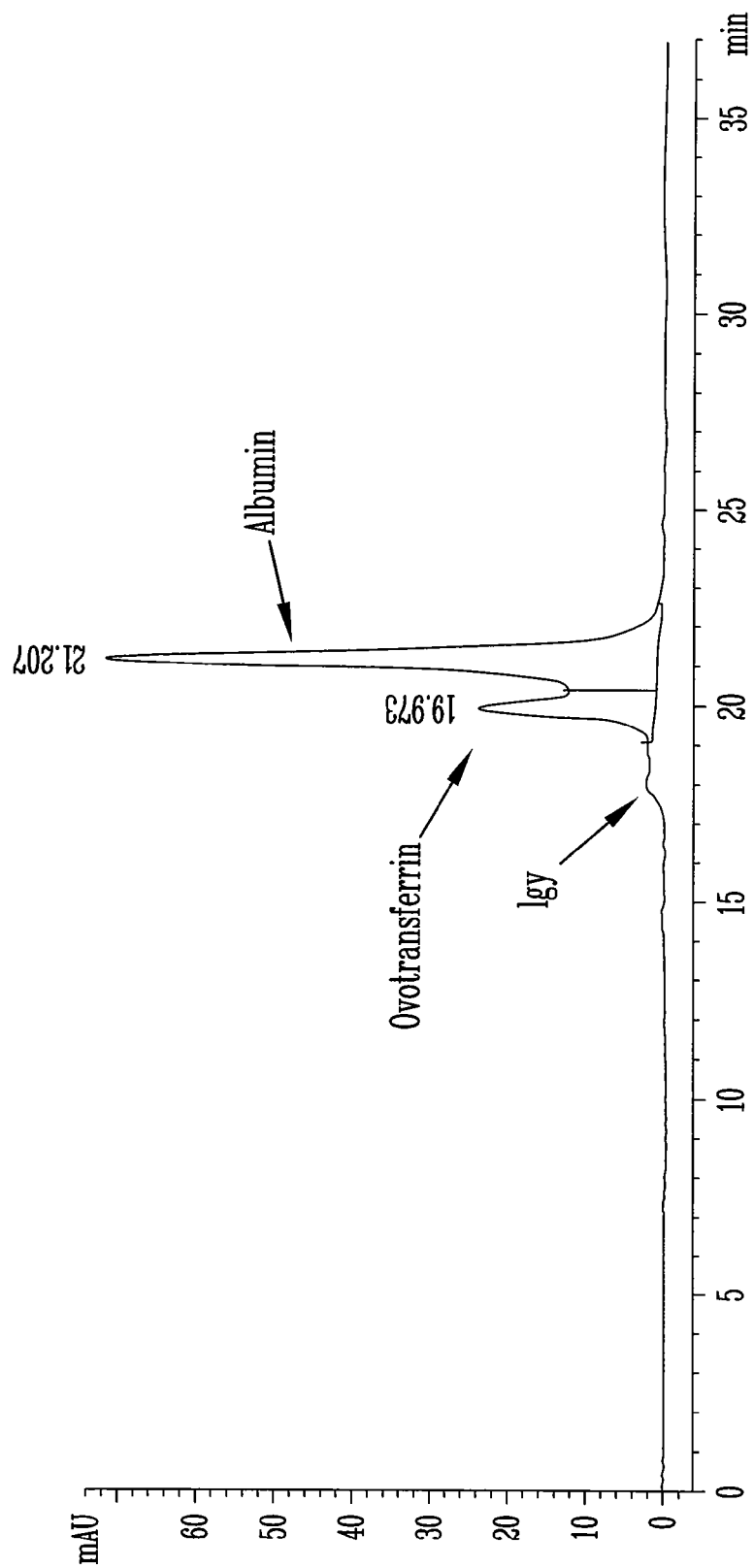
FIG. 4 is an HPLC chromatogram for the protein composition referred to as Protein Supernatant in FIG. 3A. The protein composition was obtained using the methods described herein and a membrane with a nominal 3,000 molecular weight cut off (MWCO). The composition was prepared as an aqueous sample for HPLC size exclusion analysis. The protein composition is about 91% protein per weight of composition and comprises about 75% albumin and about 23% ovotransferrin.

In one embodiment of the present invention, the method produces a protein composition that is at least 70%, 80%, 85%, or 90% protein per weight of composition, substantially lipid-free, and contains minimal salt (ash). As used herein, the term "substantially lipid-free" refers to an egg mixture or composition, the mixture or composition containing less than 2.0%, less than 1.0%, or less than 0.5% of lipids, for example, of cholesterol, triglycerides, or phospholipids or combinations thereof. In one aspect, the protein composition includes but is not limited to ovotransferrin, albumin, beta-livetin (alpha-2-glycoprotein), gamma livetin (IgY), insulin-like growth factor-1 (IGF-1), or phosvitin or combinations thereof. Advantageously, protein compositions of the present invention may include ovotransferrins which act as natural antimicrobials. In one aspect, as shown in FIG. 4, the protein composition comprises ovotransferrin and albumin. In one aspect, the protein composition is at least 70%, 80%, 85%, or 90% protein per weight of composition and comprises at least 15% or 20% ovotransferrin and greater than 70% or 75% albumin. Protein percentage may be determined by any number of methods, including but not limited to a Leco combustion analyzer.

A. Removal of Residual Lipids from Solubilized Proteins

In an embodiment of the invention, the method may include subjecting the egg mixture from which the cross-linked lipids have been removed, e.g. the supernatant having the solubilized proteins, to one or more membranes or filters to remove any residual lipids. Any suitable size membrane or filter may be used. In one aspect, as shown in FIG. 3, about an 0.8 micron to about 1.2 micron membrane or filter may be employed to separate the proteins from the egg mixture to generate a substantially lipid-free protein composition.

Figure 5:
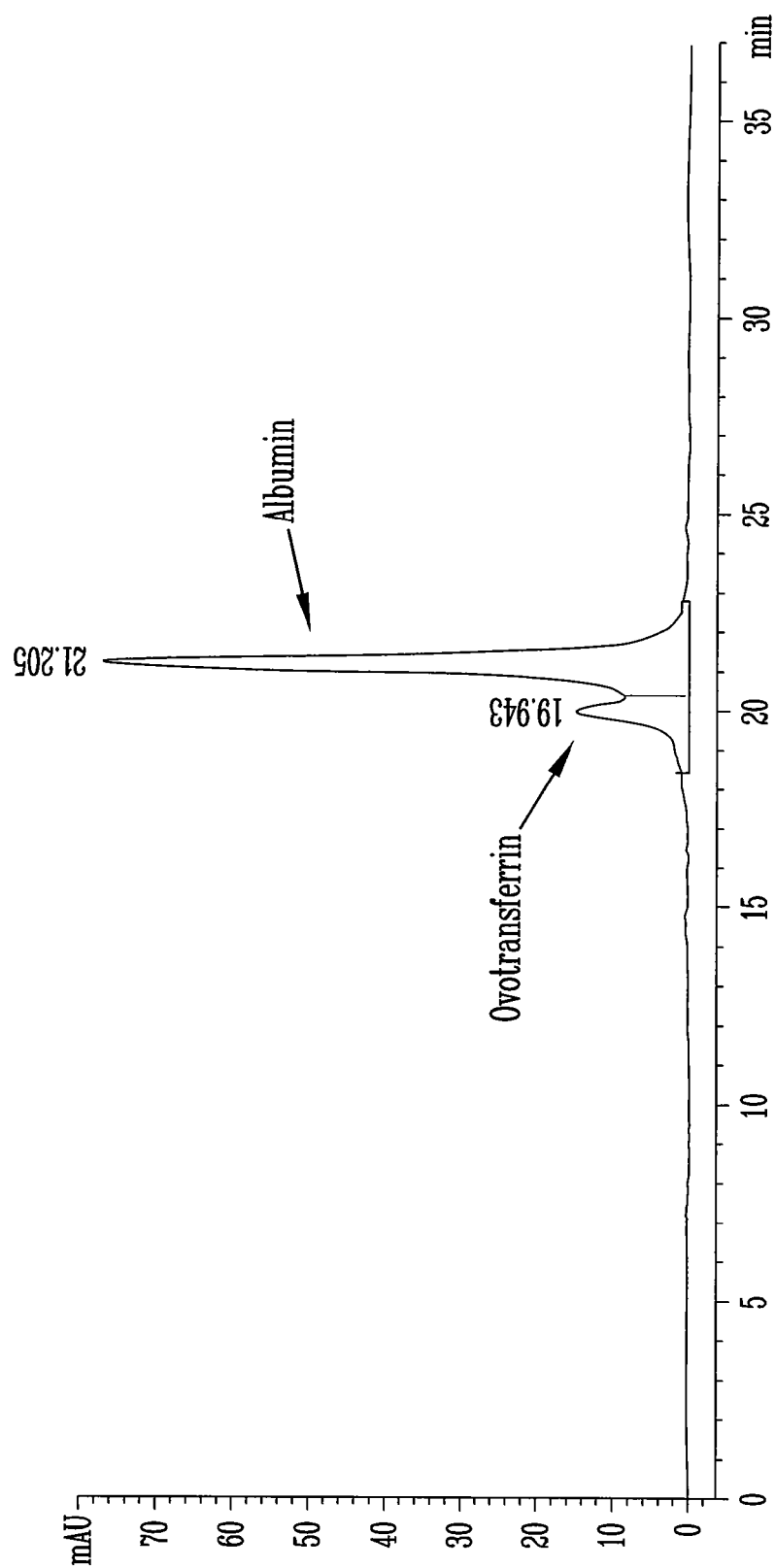
FIG. 5 is an HPLC chromatogram for the protein composition referred to as 1 Retentate in FIG. 3A. The protein composition was obtained using the methods described herein and a membrane with a 0.8 micron membrane. The composition was prepared as an aqueous sample for HPLC size exclusion analysis. The protein composition is about 91% protein per weight of composition and comprises about 82% albumin and about 17% ovotransferrin

The separated proteins may be concentrated and dialyzed. Dialyzing has the added benefit of removing salt (ash). In an embodiment of the present invention, the method may produce a protein composition that is least 70%, 80%, 85%, 90%, or 95% protein per weight of composition. In one aspect, the composition contains minimal salt (ash). In one aspect, the protein composition additionally comprises ovotransferrin, albumin, beta-livetin (alpha-2-glycoprotein), gamma livetin (IgY), IGF-1, or phosvitin or combinations thereof. In one aspect, as shown in FIG. 5, the protein composition comprises ovotransferrin and albumin. In one aspect, the protein composition comprises at least about 10%, 15% or 20% ovotransferrin and at least greater than 70%, 75% or 80% albumin. Accordingly, in one embodiment, the present invention provides for a protein composition that is at least 70%, 80%, 85%, 90%, or 95% protein per weight of composition and is at least about 10%, 15% or 20% ovotransferrin and at least greater than 70%, 75% or 80% albumin. Advantageously, the method used results in a product which is free from impurities. In particular, the method results in a product which serves as a safe source of nutritional supplement for and is suitable for human consumption. Unlike other methods used for processing the egg, toxic solvents, or other unsafe materials need not be used in the methods of the invention or are not found in the resulting product, e.g. the isolated egg component, or composition. Accordingly, in one embodiment, the protein composition or proteins isolated thereof may be used in any number of applications, including but not limited to products or services in the food, nutrition, and health industries. Such applications are known in the art as well as the appropriate techniques for inclusion in such application or compositions.

B. Isolating Specific Proteins or Populations of Proteins from the Solubilized Proteins In an embodiment of the invention, as shown in FIG. 2, the method may include subjecting the egg mixture from which the cross-linked lipids have been removed to one or more membranes or filters of various sizes to isolate specific proteins or populations of proteins of a desired size or molecular weight. Such proteins include but are not limited to ovotransferrin, albumin, beta-livetin (alpha-2-glycoprotein), gamma livetin (IgY), insulin-like growth factor-1 (IGF-1), or phosvitin or combinations thereof. As appreciated by one skilled in the art, the isolating step may be performed subsequent to the removal any residual lipids. In one aspect, the method may include subjecting the supernatant having the solubilized proteins to one or more membranes or filters. In an embodiment, the method includes separating proteins having a molecular weight greater than a determined upper molecular weight threshold (e.g., 1 kDa, 3 kDa, 50 kDa, 100 kDa) and removing proteins having a molecular weight below a determined lower molecular weight threshold (e.g., 1 kDa, 50 kDa, 100 kDa). Although a 100 kDa molecular weight cut off (MWCO) membrane or filter is preferred, larger or smaller nominal MWCO membranes or filters may be used with the methods of the present invention, ranging from 1 kDa, 5 kDa, 10 kDa, 15 kDa, 50 kDa, 100 kDa to 180 kDa, depending on the molecular weight of the protein or population of proteins of interest to be separated.

Figure 3A:
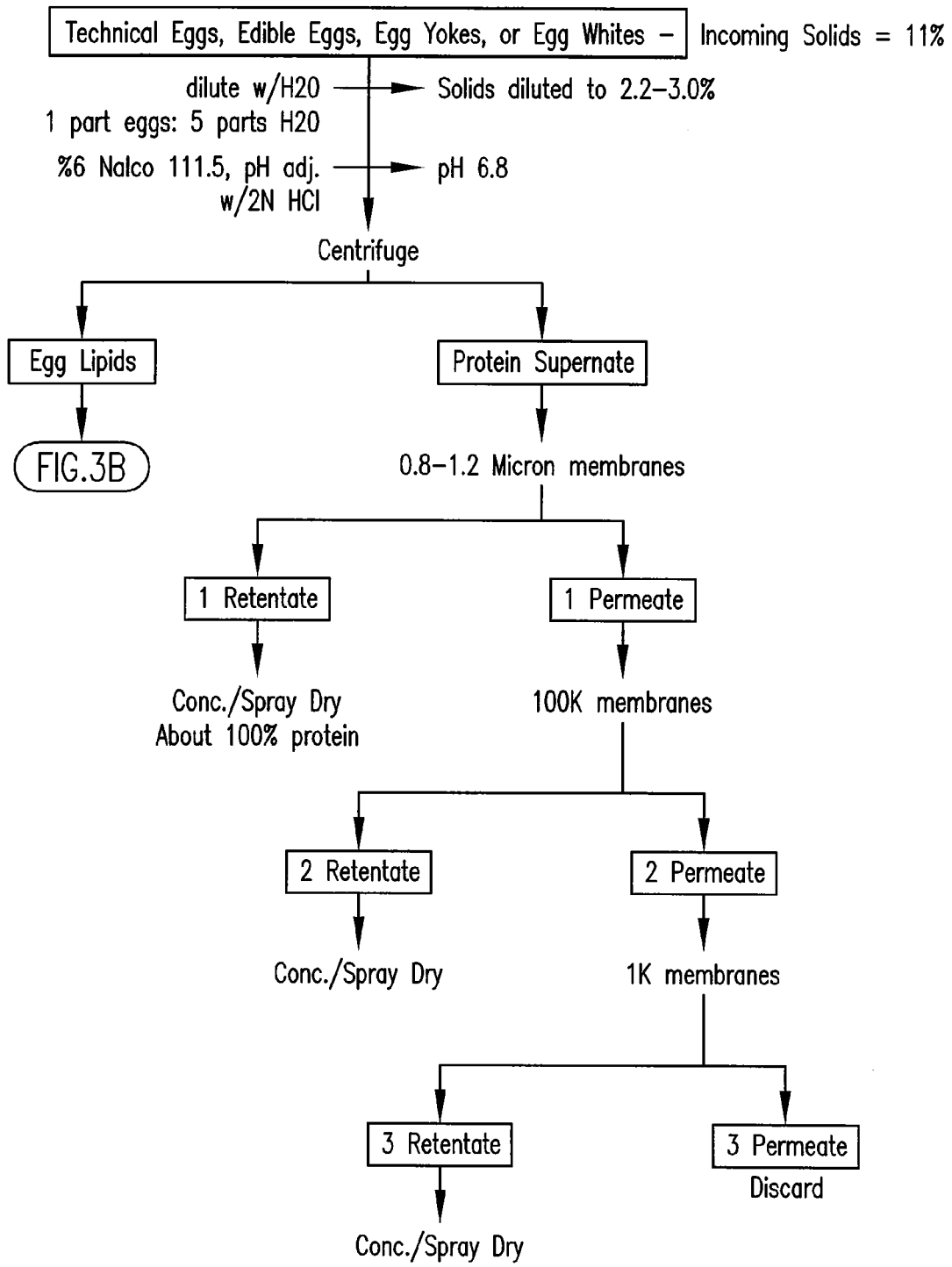
FIG. 3A is a flow chart for one embodiment of separating proteins of various sizes from an egg.
Figure 3B:
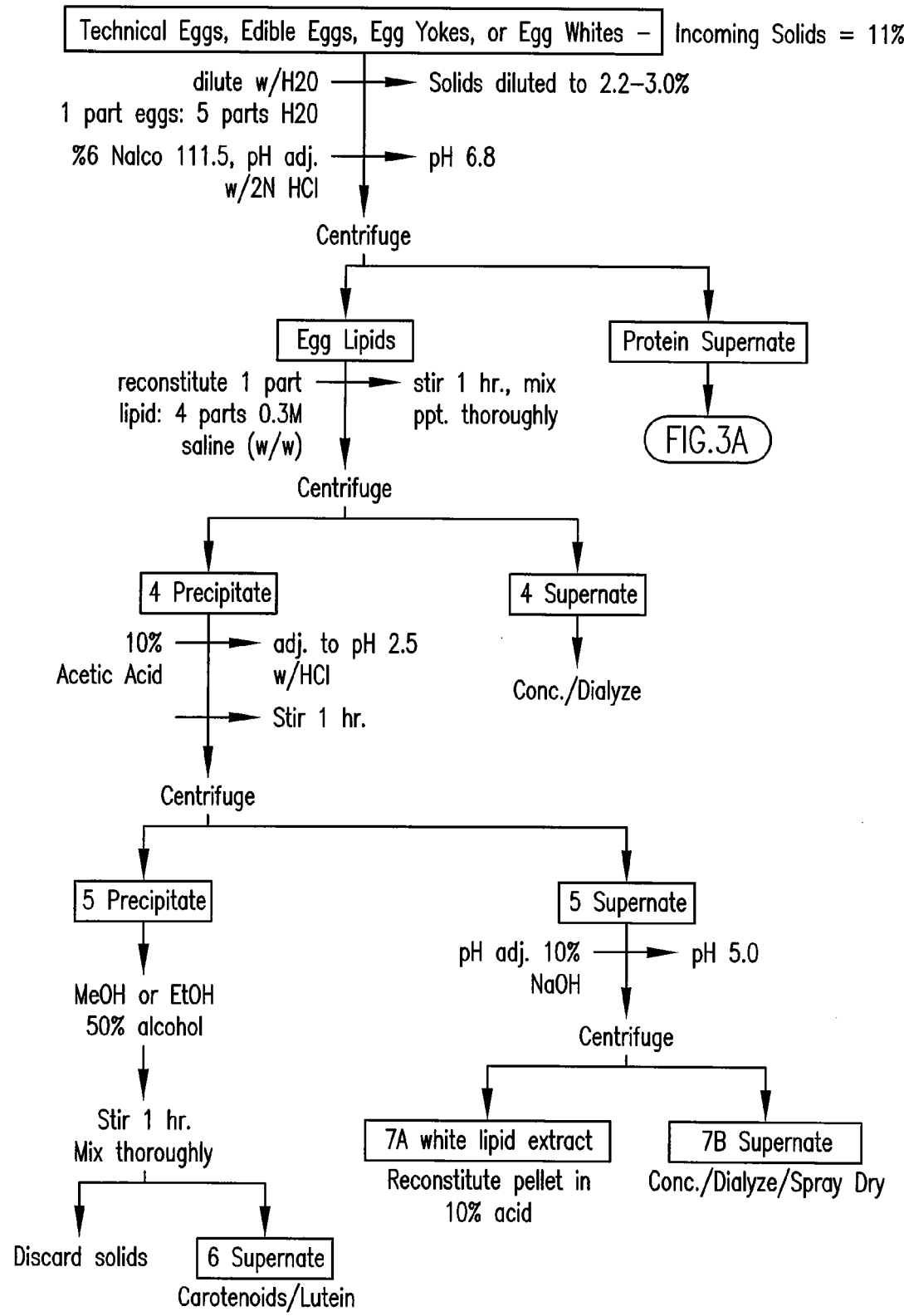
FIG. 3B is a flow chart for one embodiment of separating from cross-linked lipids of an egg, proteins of various sizes, lipoproteins, fatty-acids, and carotenoids or combinations thereof.

In one embodiment of the invention, as shown in FIG. 3A, the method includes isolating proteins that are greater than 100 kiloDaltons (kDa). Depending on the type of membrane or filter used, for example, a membrane with a nominal value, proteins having a molecular weight less than 100 kDa may be isolated as well. See FIG. 3A. Such proteins include but are not limited to ovotransferrin, albumin, beta-livetin (alpha-2-glycoprotein), gamma livetin (IgY), insulin-like growth factor-1 (IGF-1), or phosvitin or combinations thereof. A membrane or filter or chromatography column may be employed to separate proteins greater than 100 kDa in size. In one aspect, the proteins are obtained from a retentate prepared by filtering the supernatant obtained from the egg mixture using a membrane that is greater than 100 kDa in size. Accordingly, the method can be used to obtain a protein or population of proteins greater than 100 kDa. In one aspect, the egg mixture may be subjected to a first membrane or filter, such as a 0.8 μM membrane, prior to separating the proteins greater than 100 kDa in molecular weight from the egg mixture with a second membrane or filter.

In an embodiment of the invention, the method includes isolating IgY from the solubilized proteins using a membrane or filter with the appropriate MWCO. Accordingly, in one embodiment, the invention provides a protein composition that is substantially lipid-free, contains minimal salt, and includes IgY. As the methods of the present invention are highly scaleable, large amounts of IgY antibodies may be obtained in a commercially viable way for use in compositions for numerous applications. IgY, also referred to as IgY antibodies, may be obtained from avian eggs laid from hens which have been immunized in various ways, including to produce IgY antibodies effective for treating various diseases. The resulting IgY antibodies may be used for treatment of numerous varieties of diseases or conditions. Examples of such uses include, without limitation: treatment of peptic ulcers as disclosed in U.S. Pat. No. 6,797,268 to Kodama et al.; treatment of gastritis, gastric ulcers and duodenal ulcers as disclosed in U.S. Pat. No. 6,793,921 to Kodama et al.; inflammatory bowel disease as disclosed in U.S. Pat. No. 7,261,891 to Kink et al.; and skin inflammatory diseases including psoriasis and eczema as disclosed in U.S. Pat. No. 7,147,854 to Ye. All references mentioned are herein incorporated by reference, each in its entirety. Accordingly, in one embodiment, the method includes separating solubilized proteins, in particular IgY, from an egg of at least one hen immunized to produce IgY antibodies effective for treating a disease.

In an embodiment of the invention, the method includes separating proteins that are less than 100 kiloDaltons (kDa) from the resulting egg mixture from which the cross-linked lipids have been removed. Depending on the type of membrane or filter used, for example, a membrane with a nominal value, proteins having a molecular weight less than 100 kDa may be isolated as well. See FIG. 3A. Such proteins include but are not limited to ovotransferrin, albumin, beta-livetin (alpha-2-glycoprotein), gamma livetin (IgY), insulin-like growth factor-1 (IGF-1), or phosvitin or combinations thereof. A membrane or filter or chromatography column that separates proteins less than 100 kDa in molecular weight may be employed to separate such proteins from the egg mixture. In one aspect, the egg mixture is subjected to a first membrane or filter, such as a 0.8 μM membrane, prior to separating the proteins less than 100 kDa in molecular weight from the egg mixture with a second membrane or filter.

In one embodiment, as shown in FIG. 3A, the proteins are obtained from a permeate prepared by filtering the supernatant obtained from the lipid-free egg mixture using a membrane that is equal to or at least 100 kDa in molecular cut off size. As appreciated by one skilled in the art, a supernatant or permeate comprising proteins of 100 kDa or less than 100 kDa may be filtered through one or more membranes of various sizes to remove impurities or isolate specific proteins. For example, as shown in FIG. 3A, the permeate may be further subjected to a membrane that is 1 kDa or greater in molecular cut off size to remove any impurities such as salt and obtain a retentate comprising proteins greater than 1 kDa but 100 kDa or less in molecular size. Accordingly, the method can be used to obtain a protein or population of proteins of 100 kDa or less but greater than 1 kDa. With respect to ovotransferrin and albumin, a membrane that has the appropriate molecular weight cutoff of at least 100 kDa may be employed, although some variances are expected when a membrane having a nominal MWCO is used.

As appreciated by one ordinarily skilled in the art, proteins or populations of proteins, for example, those greater or less than 100 kDa, may be separated from the egg mixture or further isolated using any number of techniques, including but not limited to dialysis, precipitation, sedimentation, centrifugation, decantation, particulate filtration, membrane filtration, such as gel filtration using a molecular sieve, temperature modification, extraction, such as liquid-liquid extraction, solvent extraction, and desalting with 1:5 or 1:10 dilution with water, chromatography, such as anion exchange chromatography using a resin such as diethylaminoethyl (DEAE)-Sepharose or DIAION HPA-75 (manufactured by Mitsubishi Chemical), cation exchange chromatography using a resin such as S-Sepharose FF (manufactured by Pharmacia), hydrophobic chromatography using a resin such as butyl-Sepharose or phenyl-Sepharose, affinity chromatography, size exclusion chromatography, chemical precipitations, chromatofocusing and electrophoresis such as isoelectric focusing, and the like and combinations thereof. The isolated proteins may be concentrated and dialyzed. Dialyzing has the added benefit of removing salt (ash).

If desired, the isolated protein or population of proteins, for example, those greater or less than 100 kDa, may be further purified, using for example, dialysis and/or chromatography, or sequential chromatographies, of anion- or cation exchange column chromatography using a resin of DEAE or CM, affinity chromatography using a gel of "heparin, biotin, hydroxyapatite, hydrophobic chromatography using a gel of methyl HIC or t-butyl HIC, or affinity chromatography. See for example, Awade, A. C. On hen egg fractionation: application of liquid chromatography to the isolation and purification of hen egg white and egg yolk proteins. Z. Lebensm.-Unters.-Forsch. (1996). 202: 1-14, herein incorporated by reference in its entirety. Dialyzing has the added benefit of removing the ash (or salt). The proteins may be isolated or purified for use in any number of applications, including protein compositions.

Additional individual proteins or polypeptides, e.g. those less than 100 kDa, isolated by the methods of the present invention may be may be determined using routine techniques known to those ordinarily skilled in the art. Exemplary techniques include but are not limited to ELISA, Western blot analysis, 2D-PAGE (Westermeier, R.; Naven, T. *Proteomics in practice*; Wiley-VCH: Weinheim, 2002; pp 11-97) and automated spot identification by matrix-assisted laser desorption-ionization mass spectrometry (MALDI-MA) or liquid chromatography electrospray ionization mass spectrometry (LC-ESI MS) (Dass, C. Structural Analysis of Proteins. In *Principles and practice of biological mass spectromety*; Dass, C., Ed.; Wiley-Interscience: New York, 2001; pp 75-216).

Figure 6:
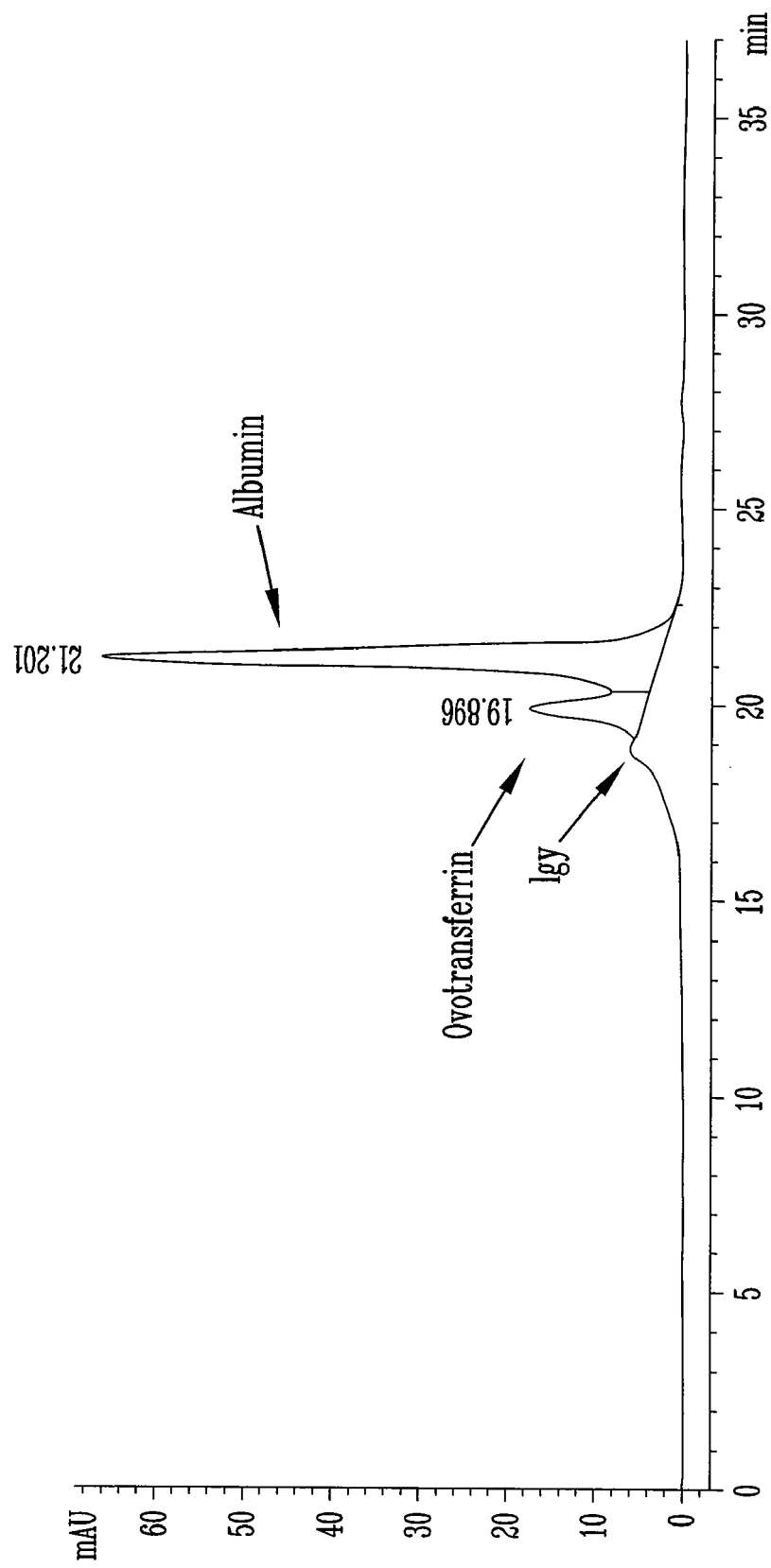
FIG. 6 is an HPLC chromatogram for the protein composition referred to as 2 Retentate in FIG. 3A. The protein composition was obtained using the methods described herein and a membrane with a nominal 100,000 molecular weight cut off (MWCO). The composition was prepared as an aqueous sample for HPLC size exclusion analysis. The protein composition is about 95% protein per weight of composition and comprises 82% albumin and 9% ovotransferrin.

In one embodiment, the method of the present invention produces a protein composition having proteins that are greater than 100 kDa. In one aspect, present invention produces a protein composition that is at least 5%, 10%, 15% or 20% protein per weight of the composition. In one aspect, the protein composition is substantially lipid-free. The composition may contain minimal salt (ash). In one aspect, the protein composition includes but is not limited to albumin, ovotransferrin, beta-livetin (alpha-2-glycoprotein), gamma livetin (IgY), insulin-like growth factor-1 (IGF-1), or phosvitin or combinations thereof. As shown in FIG. 6, the protein composition comprises IgY, albumin and ovotransferrin. The protein composition may comprise at least about 5% or 10% ovotransferrin. The protein composition may comprise at least about 70%, 75%, or 80% albumin. The protein composition may comprise at least about 9% ovotransferrin and at least greater than 80% albumin.

Figure 7:
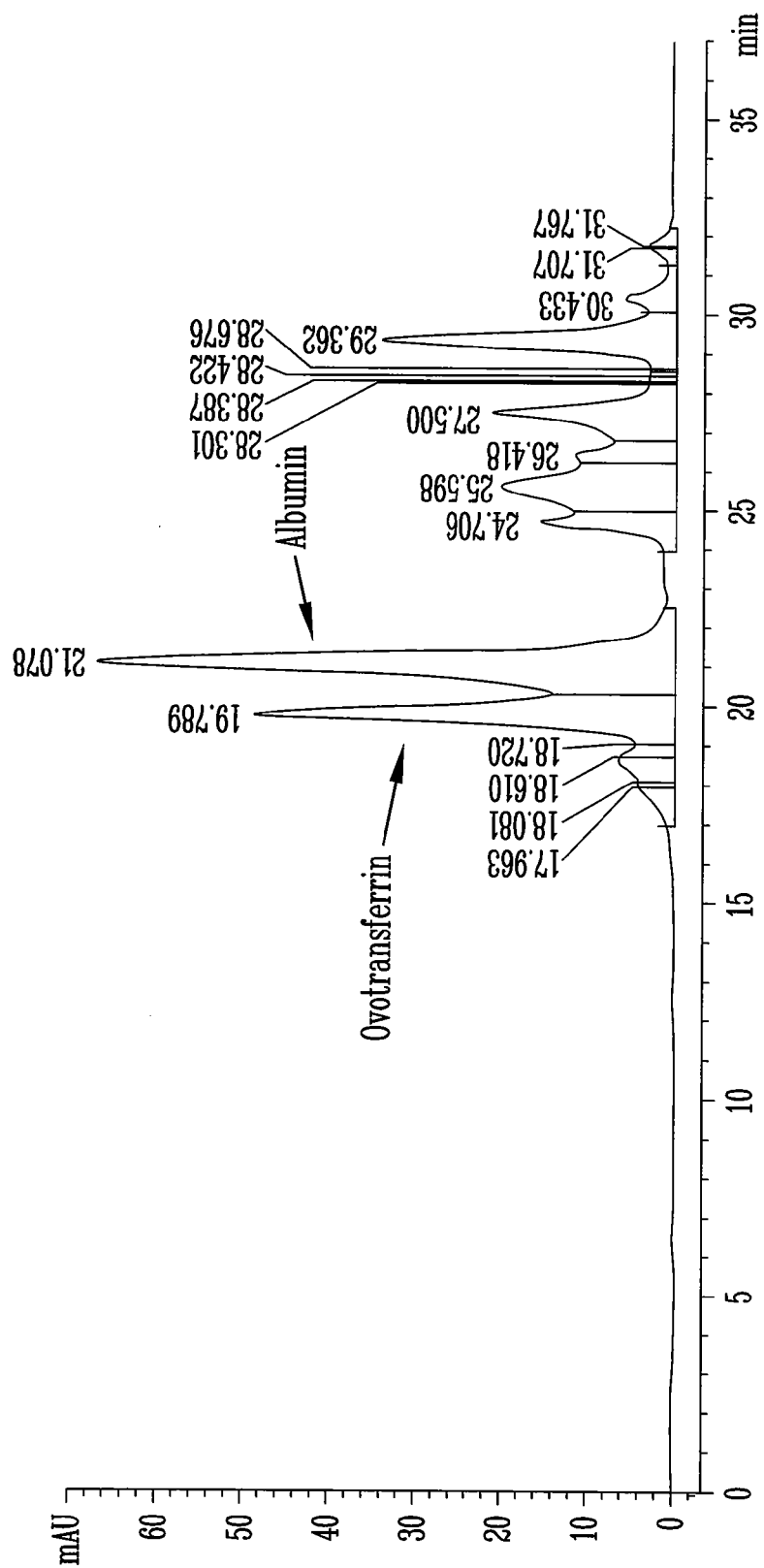
FIG. 7 is an HPLC chromatogram for the protein composition referred to as 3 Retentate in FIG. 3A. The protein composition was obtained using the methods described herein and a membrane with a nominal 1,000 molecular weight cut off (MWCO). The composition was prepared as an aqueous sample for HPLC size exclusion analysis. The protein composition is about 18% protein per weight of composition and comprises 29% albumin and 18% ovotransferrin and 50% of polypeptides less than 100 kDa.

In one embodiment, the method of the present invention produces a protein composition having proteins that are less than or equal to 100 kDa. The protein composition may be at least 70%, 80%, 85%, 90%, or 95% protein per weight of the composition. The protein composition is substantially lipid-free. The composition may contain minimal salt (ash). The protein composition includes but is not limited to albumin, ovotransferrin, beta-livetin (alpha-2-glycoprotein), gamma livetin (IgY), insulin-like growth factor-1 (IGF-1), or phosvitin or combinations thereof. In one aspect, the protein composition includes small molecular weight polypeptides that are less than 100 kDa. As used herein, the term "polypeptide" means an unbranched chain of amino acid residues that are covalently linked by an amide linkage between the carboxyl group of one amino acid and the amino group of another. The term polypeptide can encompass whole proteins (i.e. a functional protein encoded by a particular gene), as well as fragments of proteins. In one aspect, the protein composition includes small molecular weight proteins that are less than 100 kDa comprise 40%, 45%, 50% or 55% of the protein composition. As shown in FIG. 7, the protein composition comprises albumin and ovotransferrin. In one aspect, the protein composition comprises at least about 5%, 10% or 15% ovotransferrin. In one aspect, the protein composition comprises at least about 20%, 25%, 30% or 35% albumin. In one aspect, the protein composition comprises at least about 5% ovotransferrin, at least greater than 20% albumin and 18% protein per weight of composition. The protein composition resulting from the method of the present invention may be prepared in any number of forms or formulations. The protein may be prepared as a protein powder using any suitable technique, including but not limited to lyophilization, vacuum drying, freeze drying, spray drying, drum drying, paddle-drying, super critical fluid processing, air drying, or other forms of evaporative drying. The drying step may be carried out any suitable temperature, for example, with respect to freeze drying, a preferred temperature range is from about 23° C. to about 40° C., with 27° C. being the more preferred temperature.

Advantageously, the method used results in a protein composition which is free from impurities. In particular, the method results in a protein composition which serves as a safe source of nutritional supplement for human consumption. Unlike other methods used for processing the egg, toxic solvents, or other unsafe materials need not be used in the methods of the invention or are not found in the resulting protein composition, e.g. the isolated egg protein, or protein composition. Accordingly, the protein composition or proteins isolated thereof may be used in any number of applications, including but not limited to products or services in the food, nutrition, and health industries. Such applications are known in the art as well as the appropriate techniques for inclusion in such application or compositions.

For example, the protein compositions of the present invention, in any suitable form, e.g. aqueous or dried, can then be applied to, admixed with and/or injected into consumable products for humans or animals, including farm animals or pets. Such consumable products include food or nutritive additives such as animal feed, human food products, nutrition supplements for humans or animals, or the like. Accordingly, a method of the present invention includes treating an animal or human in need of protein or amino acids by administering a protein composition of the present invention. The protein compositions may be administered to an animal or human to increase their protein consumption. In some cases, the animal or human may need to increase their consumption of amino acids or proteins, such as an athlete, body-builder, weight-lifter, pregnant individual, individual recovering from surgery, trauma, or illness, or a diabetic individual.

Animal feed and products according to the invention, e.g., dry food pellets and treats, will be designed such that they contain appropriate nutrition levels for the particular animal, e.g., a dog or cow. In this regard, the design of food formulations for humans, e.g. body-builders, particular animals, e.g., dog or cow, etc., is well known and established. There exist accepted nutritional guidelines for optimal amounts of proteins, fats, vitamins, minerals, fibers, that vary dependent upon whether the consumer is a human or particular animal and the consumer's age and health. It is anticipated that the protein compositions of the present invention can be added or incorporated to any animal or human drink, beverage, feed, food, product or supplement.

III. Separating Proteins Associated with the Cross-Linked Lipids from the Cross-Linked Lipids A. Using a Saline Solution to Separate Proteins Associated with the Cross-Linked Lipids from the Cross-Linked Lipids In one embodiment of the present invention, the method includes separating proteins associated with the cross-linked lipids from the cross-linked lipids. Such proteins include without limitation TGF-beta, transfer factors, lysozyme, albumin, or ovotransferrin and the like or combinations thereof. In one embodiment, subsequent to the cross-linking of the lipids, a saline solution may be used to facilitate the release of proteins from the cross-linked lipids. Typically, the pH of the saline solution does not need to be readjusted from the pH of the previous solution.

Figure 8:
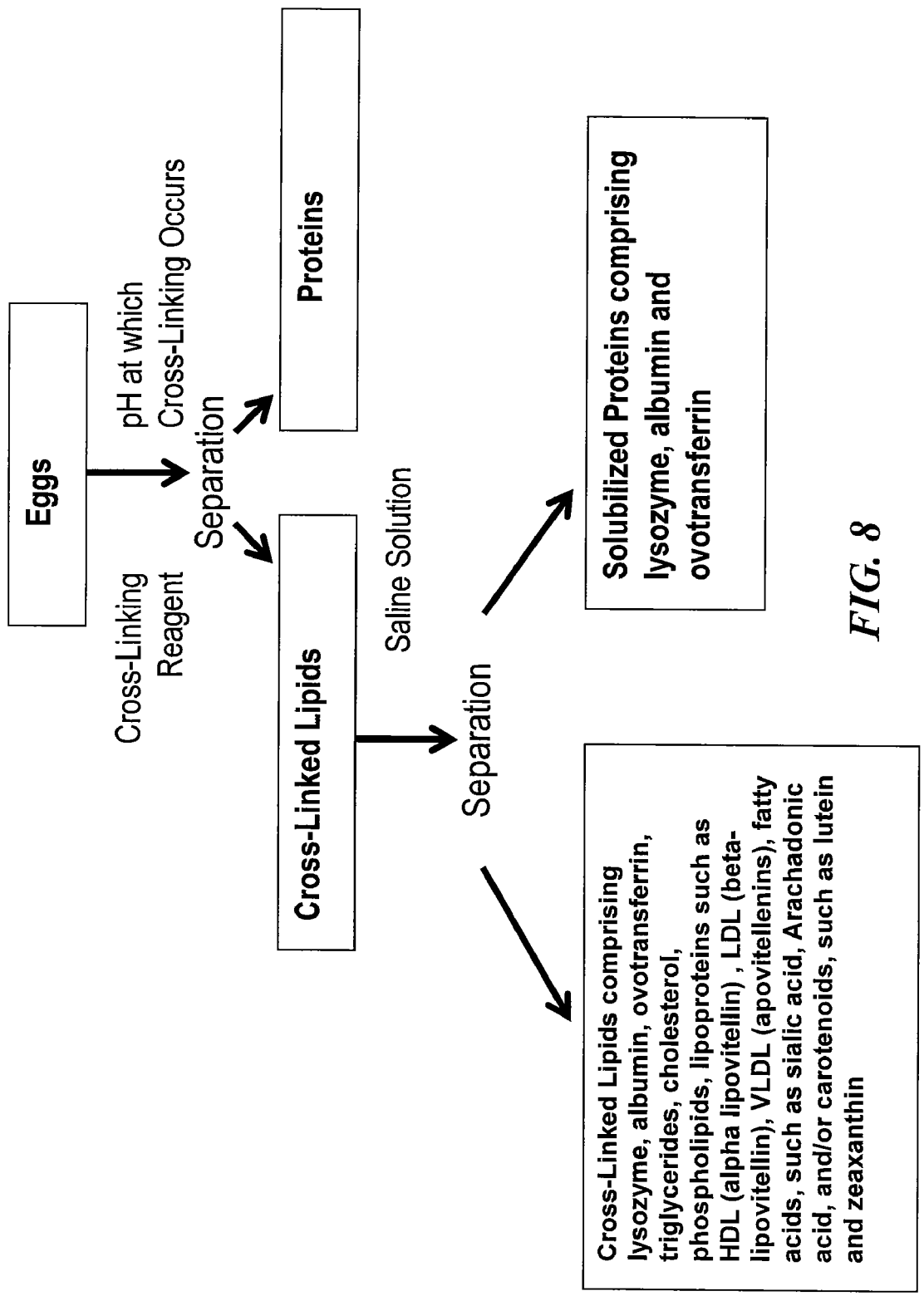
FIG. 8 is a flow chart for one embodiment of separating from cross-linked lipids of an egg, proteins typically associated with lipids from an egg. Components that typically remain associated with the cross-linked lipids are also shown.

In one embodiment, as shown in FIG. 8, the method for separating proteins associated with the cross-linked lipids from the cross-linked lipids includes resuspending the cross-linked lipids, for example, the precipitate comprising the cross-linked lipids, in a saline solution. Any molarity of the saline solution that disrupts the cross-linked lipids-protein interactions or protein-protein interactions so that the proteins disassociate from the cross-linked lipids or from proteins associated with the cross-linked lipids may be used, for example, a molarity that solubilizes the proteins into solution. Without wishing to be bound by this theory, it is contemplated that the saline solution neutralizes charges of protein-protein interactions or protein-lipid interactions or both. As appreciated by one skilled in the art, solubilization of the proteins may be facilitated by stirring or mixing the saline solution comprising the cross-linked lipids. In some instances, the solubilization of the proteins may occur in as little as one hour. Any amount of solution may be used so long as the amount is sufficient to overcome protein-protein interactions or protein-lipid interactions so that the proteins are released and solubilized in the solution, for example, 4 parts saline to 1 part lipid (4:1) ratio may be used. In one aspect, the saline solution has a molarity (M) from about 0.1 M to about 2.0 M, in a preferred range; the molarity of the saline solution is from about 0.2M to 1.0 M, more preferably the molarity of the saline solution is from about 0.2M to 0.3M. A person skilled in the art may appropriately select the temperature, the amount of the salt to be used, and the period of time sufficient to release to the proteins associated with the cross-linked lipids. An example of typical conditions include carrying out the cross-linking reaction for about 30 minutes to about 2 hours at a temperature of about 14° C. to about 37° C. at a pH from about 4 to about 8, more preferably from a pH from about 6.0 to 7.5.

Once the proteins of interest are released from the cross-linked lipids, one skilled in the art would be able to readily use standard biochemistry techniques to isolate one or more proteins of interest from the saline solution. As appreciated by one ordinarily skilled in the art, the solubilized proteins in the saline solution may be separated from cross-linked lipids using any number of standard techniques, including but not limited to dialysis, precipitation, sedimentation, centrifugation, decantation, particulate filtration, membrane filtration, such as gel filtration using a molecular sieve, temperature modification, extraction, such as liquid-liquid extraction, solvent extraction, and desalting with 1-2.5 mS for salt removal, chromatography, such as anion exchange chromatography using a resin such as diethylaminoethyl (DEAE)-Sepharose or DIAION HPA-75 (manufactured by Mitsubishi Chemical), cation exchange chromatography using a resin such as S-Sepharose FF (manufactured by Pharmacia), hydrophobic chromatography using a resin such as butyl-Sepharose or phenyl-Sepharose, affinity chromatography, size exclusion chromatography, chemical precipitations, chromatofocusing and electrophoresis such as isoelectric focusing, and the like and combinations thereof. Accordingly, the process of the invention may also include isolating from the supernatant, retentate, permeate, precipitate, protein or lipid compositions, various proteins or other components of interest.

In one aspect, the proteins are obtained from a supernatant prepared by centrifuging the cross-linked lipids/saline mixture and by employing standard techniques, such as concentrating the proteins by membrane filtration or dialysis. Dialyzing has the added benefit of removing the salt (ash). The supernatant may be filtered through one or more membranes of a suitable size to isolate specific components, including proteins such as lysozyme. In another aspect, proteins may be isolated according to the methods of the present invention, for example, based in part on the proteins molecular weight.

Proteins that have a known molecular weight may be isolated using a membrane or a series of membranes that have the appropriate exclusion limit for isolating the particular protein or proteins of interest. Accordingly, the selection of membrane size can be used to obtain a protein or population of proteins of a particular size (molecular weight). With respect to lysozyme, albumin, and ovotransferrin, a membrane that has the appropriate molecular weight cutoff, e.g. 3-10 kDa, may be employed. As appreciated by one skilled in the art, the supernatant may be filtered through one or more membranes of various sizes to isolate specific proteins. Accordingly, the method can be used to obtain a protein or population of proteins of a desired size or molecular weight. In another aspect, the proteins may be further separated using a membrane that has the appropriate molecular weight cutoff of at least 50 kDa to separate ovotransferrin from lysozyme and albumin.

As one skilled in the art would appreciate, proteins of similar molecular size, e.g. lysozyme and albumin, may be difficult to separate by membranes and other techniques may be employed for such purposes. If desired, the isolated protein or population of proteins may be further purified, using for example, chromatography such as sequential chromatographies of anion-exchange column chromatography using a resin of DEAE or CM, affinity chromatography using a gel of heparin, biotin, hydroxyapatite, hydrophobic chromatography using a gel of methyl HIC or t-butyl HIC. See for example, Awade, A. C. On hen egg fractionation: application of liquid chromatography to the isolation and purification of hen egg white and egg yolk proteins. Z. Lebensm.-Unters.-Forsch. (1996). 202: 1-14, herein incorporated by reference in its entirety. The proteins may be isolated or purified for use in any number of applications.

In another aspect, the identification of isolated proteins may be determined using routine techniques known to those ordinarily skilled in the art. Exemplary techniques include but are not limited to ELISA, Western blot analysis, 2D-PAGE (Westermeier, R.; Naven, T. *Proteomics in practice*; Wiley-VCH: Weinheim, 2002; pp 11-97) and automated spot identification by matrix-assisted laser desorption-ionization mass spectrometry (MALDI-MA) or liquid chromatography electrospray ionization mass spectrometry (LC-ESI MS) (Dass, C. Structural Analysis of Proteins. *In Principles and practice of biological mass spectrometry*; Dass, C., Ed.; Wiley-Interscience: New York, 2001; pp 75-216).

Figure 12:
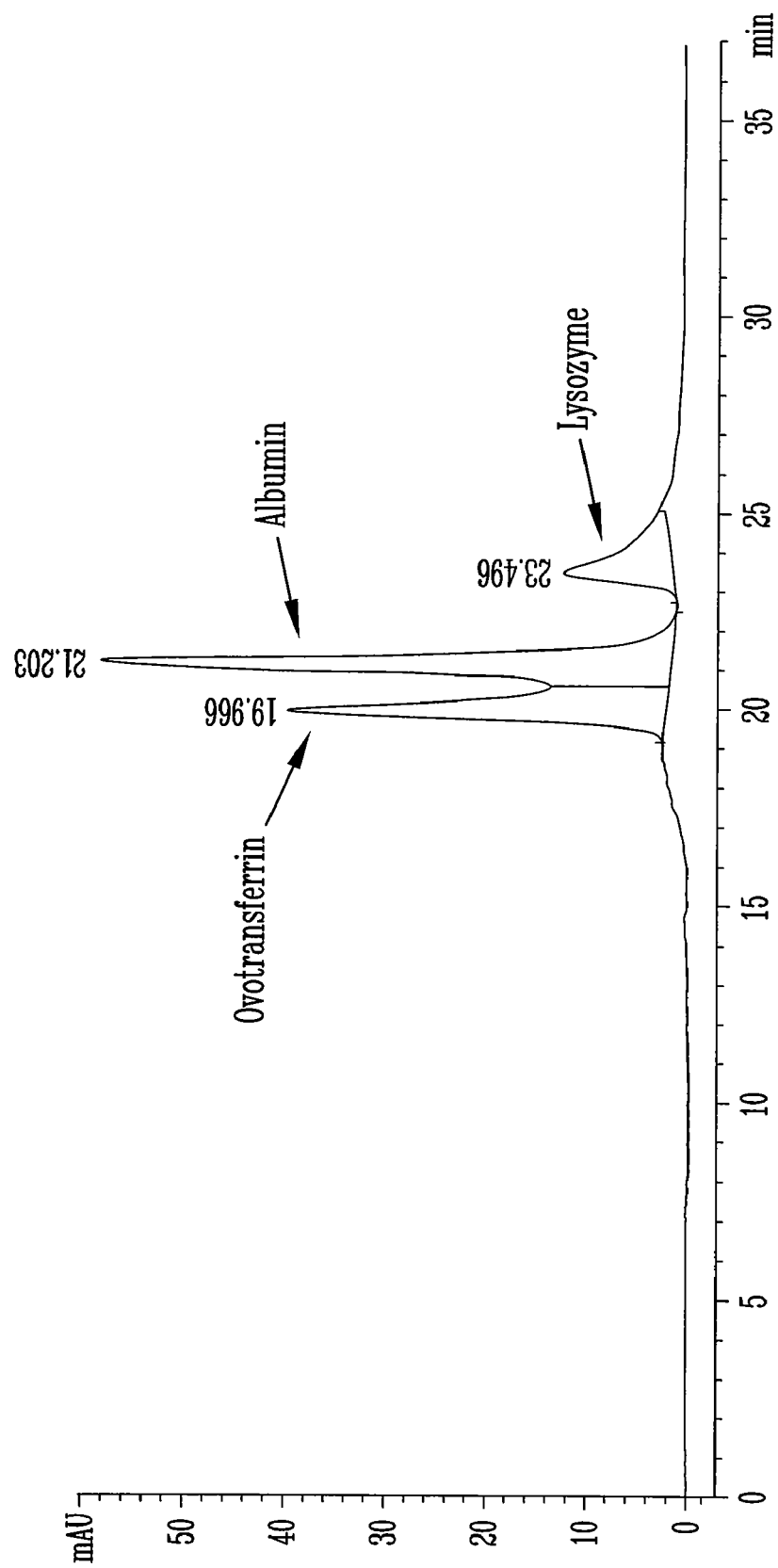
FIG. 12 is an HPLC chromatogram for the protein composition referred to as 4 Supernatant in FIG. 3B. The protein composition was obtained using the methods described herein and a membrane with a nominal 3,000 molecular weight cut off (MWCO). The composition was prepared as an aqueous sample for HPLC size exclusion analysis. The protein composition is about 88% protein per weight of composition and comprises 49% albumin, 35% ovotransferrin, and 15% lysozyme.

Obtained from methods of the present invention is a protein composition comprising TGF-beta, transfer factors, lysozyme, albumin, or ovotransferrin and the like or combinations thereof. In one embodiment, the protein composition is at least about 70%, 75%, 80%, 85%, or 90% protein per weight of composition. In one aspect, as shown in FIG. 12, the protein composition comprises albumin, ovotransferrin, and lysozyme. In one aspect, the protein composition comprises at least about 40%, 45%, 50% albumin. In one aspect, the protein composition comprises at least about 30%, 35%, or 40% ovotransferrin. In one aspect, the protein composition comprises at least 10% or 15% lysozyme. In one aspect, the protein composition comprises at least about 40%, 45%, 50% albumin and at least about 30%, 35%, or 40% ovotransferrin, and at least 10% or 15% lysozyme.

In one aspect, the protein composition is substantially lipid-free. As appreciated by one ordinarily skilled in the art, the lipids can easily be removed using membrane filtration to generate a substantially lipid-free protein composition. The protein product may be further processed by freeze drying, concentrating or spray drying the protein product to any suitable form. Advantageously, the method used results in a protein composition which is free from impurities. In particular, the method results in a protein composition which serves as a safe source of nutritional supplement for human consumption. Unlike other methods used for processing the egg, toxic solvents, or other unsafe materials need not be used in the methods of the invention or are not found in the resulting protein composition, e.g. the isolated egg protein, or protein composition. Accordingly, the protein composition or proteins isolated thereof may be used in any number of applications, including but not limited to products or services in the food, nutrition, and health industries. Such applications are known in the art as well as the appropriate techniques for inclusion in such application or compositions.

For example, the protein compositions of the present invention, in any suitable form, e.g. aqueous or dried, can then be applied to, admixed with and/or injected into consumable products for humans or animals, including farm animals or pets. Such consumable products include food or nutritive additives such as animal feed, human food products, nutrition supplements for humans or animals, or the like. Accordingly, a method of the present invention includes treating an animal or human in need of protein or amino acids by administering a protein composition of the present invention. The protein compositions may be administered to an animal or human to increase their protein consumption. In some cases, the animal or human may need to increase their consumption of amino acids or proteins, such as an athlete, body-builder, weight-lifter, pregnant individual, individual recovering from surgery, trauma, or illness, or a diabetic individual.

Animal feed and products according to the invention, e.g., dry food pellets and treats, will be designed such that they contain appropriate nutrition levels for the particular animal, e.g., a dog or cow. In this regard, the design of food formulations for humans, e.g. body-builders, particular animals, e.g., dog or cow, etc., is well known and established. There exist accepted nutritional guidelines for optimal amounts of proteins, fats, vitamins, minerals, fibers, that vary dependent upon whether the consumer is a human or particular animal and the consumer's age and health. It is anticipated that the protein compositions of the present invention can be added or incorporated to any animal or human drink, beverage, feed, food, product or supplement.

B. Adjusting the pH to an Acidic Range for Separating Proteins Associated with the Cross-Linked Lipids from the Cross-Linked Lipids In one embodiment of the present invention, the method includes separating proteins associated with the cross-linked lipids from the cross-linked lipids by contacting the cross-linked lipids with an acidic solution having a pH range from about 2.0 to about 4.0. Such proteins include but are not limited to lysozyme, albumin, ovotransferrin, TGF-beta or transfer factors or the like or combinations thereof. Without wishing to be bound by this theory it is believed that an acidic solution with a pH from about 2.0 to about 4.0 facilitates the release of proteins associated with the cross-linked lipids from the cross-linked lipids into the acidic solution, e.g. in some cases the proteins are released from carrier proteins associated with the cross-linked lipids. In some embodiments, the cross-linked lipids are exposed to a solution that has a pH from about 2.0 to about 4.0 subsequent to exposing the cross-linked lipids to the saline solution described above or subsequent to the initial step of cross-linking the lipids.

In an embodiment of the invention, the separated cross-linked lipids suspended in solution, e.g. the egg mixture, may be treated with an appropriate solution to adjust the pH range of the cross-linked lipids-solution to a pH value of from about 2.0 to about 4.0, preferably from a pH from about 2.5 to about 3.0. In an embodiment of the invention, as shown in FIG. 3, the method includes resuspending a precipitate of the cross-linked lipids in an acidic solution that has a pH from about 2.0 to about 4.0, preferably from a pH from about 2.5 to about 3.0. A person skilled in the art may appropriately select the temperature, the amount of the acid to be used, and the period of time sufficient to release to the proteins associated with the cross-linked lipids. An example of typical conditions includes carrying out the separation reaction under acidic conditions of a pH from about 2.0 to about 4.0, more preferably from about 2.5 to 3.0, for about 10 minutes to about 1 hour at a temperature of about 14° C. to about 32° C. Stirring or mixing may be employed to facilitate their release. Non-limiting examples of suitable acids include acetic acid, carbonic acid, oxalic, phosphoric, chloroacetic, citric, formic, benzoic, succinic, propionic, hydrochloric, nitric, sulfuric, hydrotropic, hydrologic, perchloric, chloric, phosphoric, and sulfurous acids or combinations thereof.

In one aspect, the released proteins are obtained from the supernatant prepared by centrifuging the acidic solution having a pH from about 2.0 to about 4.0 and by employing standard techniques, such as concentrating the proteins and dialyzing the concentrated proteins. In one aspect, the supernatant may be filtered through one or more filters or membranes of a suitable size to isolate specific proteins, such as lysozyme, albumin, ovotransferrin, TGF-beta and transfer factors or the like or combinations thereof. In another aspect, proteins may be isolated according to the methods of the present invention, for example, based in part on the proteins molecular weight. In one aspect, proteins that have a known molecular weight may be isolated using a membrane or a series of membranes that have the appropriate molecular cut off for isolating the particular protein or proteins of interest. Accordingly, the selection of membrane size can be used to obtain a protein or population of proteins of a particular size (molecular weight). With respect to TGF-beta, IGF and transfer factors, a membrane that has the appropriate molecular weight cutoff of at least 10 kDa, 5 kDa, and 1 kDa respectively may be employed.

In one aspect of the invention, the released proteins are separated from the acidic solution having a pH from about 2.0 to about 4.0 or further isolated using any number of standard techniques, including but not limited to dialysis, precipitation, sedimentation, centrifugation, decantation, particulate filtration, membrane filtration, such as gel filtration using a molecular sieve, temperature modification, extraction, such as liquid-liquid extraction, solvent extraction, salting out and desalting with NaCL or KCl, chromatography, such as anion exchange chromatography using a resin such as diethylaminoethyl (DEAE)-Sepharose or DIAION HPA-75 (manufactured by Mitsubishi Chemical), cation exchange chromatography using a resin such as S-Sepharose FF (manufactured by Pharmacia), hydrophobic chromatography using a resin such as butyl-Sepharose or phenyl-Sepharose, affinity chromatography, size exclusion chromatography, chemical precipitations, chromatofocusing and electrophoresis such as isoelectric focusing, and the like and combinations thereof. The separated or isolated proteins may be concentrated and dialyzed. Dialyzing has the added benefit of removing the salt (ash).

Figure 13:
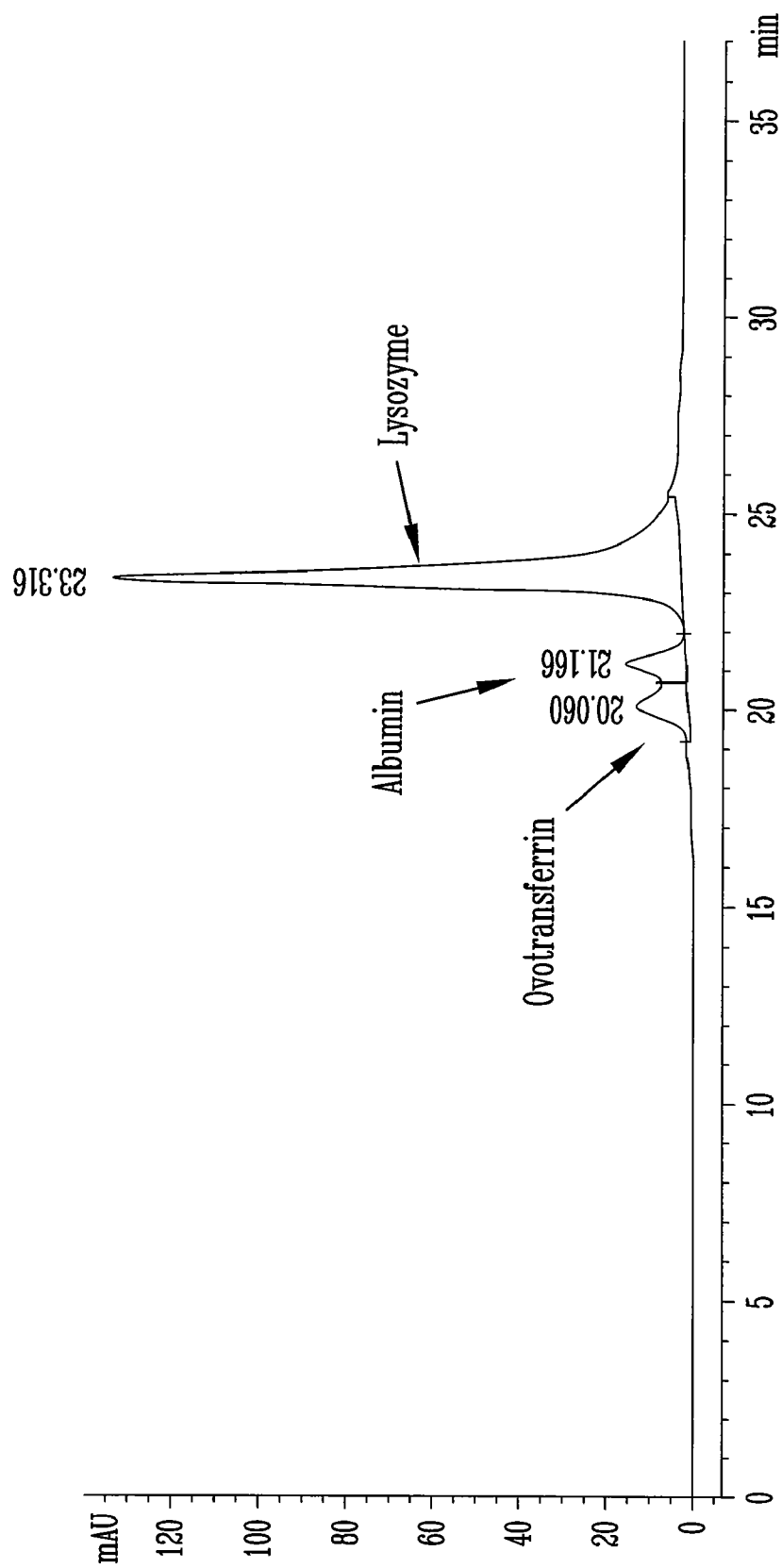
FIG. 13 is an HPLC chromatogram for the protein composition referred to as 4 Supernatant in FIG. 3B. The protein composition was obtained using the methods described herein and a membrane with a nominal 3,000 molecular weight cut off (MWCO). The composition was prepared as an aqueous sample for HPLC size exclusion analysis. The protein composition is about 89% protein per weight of composition and comprises 8% albumin, 9% ovotransferrin, and 83% lysozyme.
Figure 14:
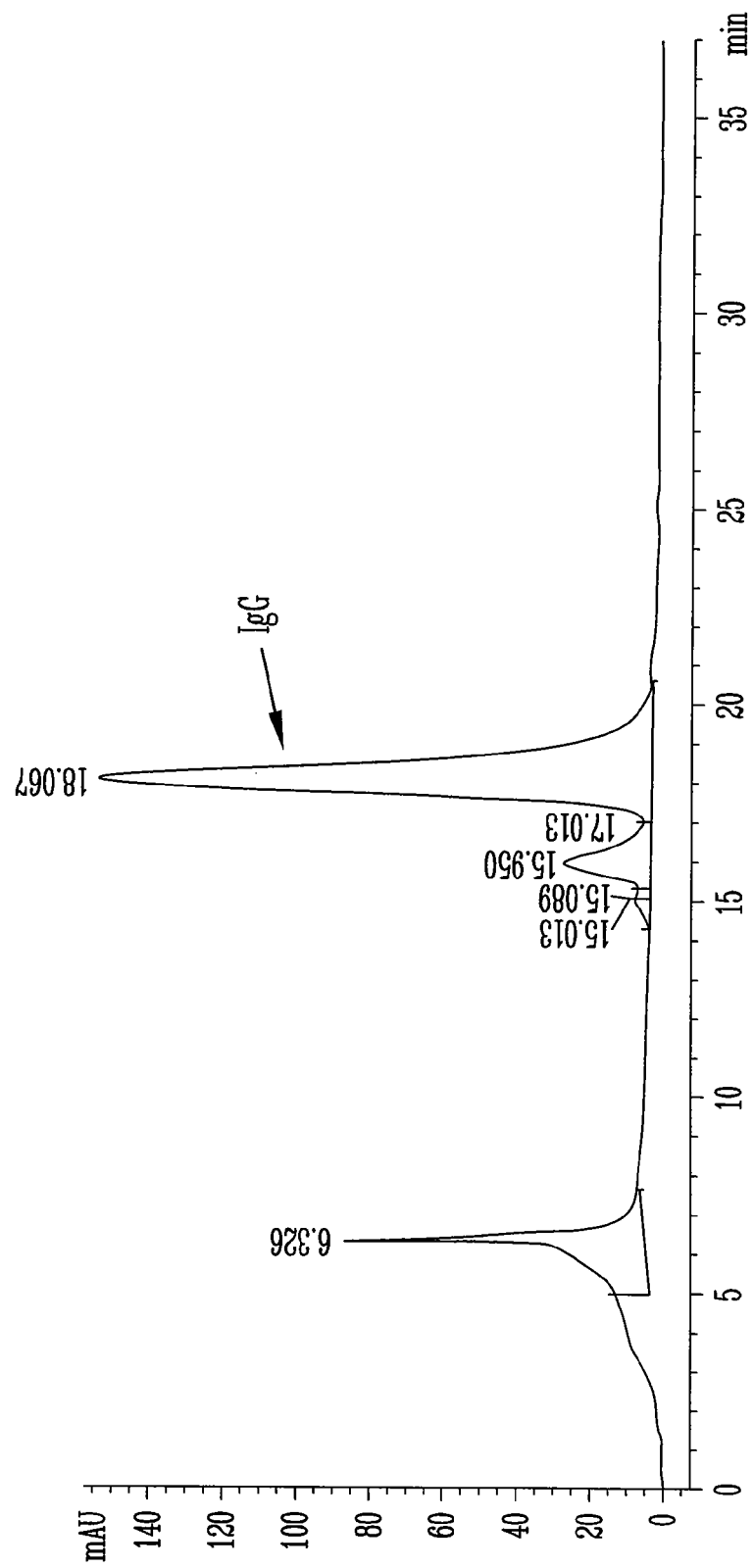
FIG. 14 is an HPLC chromatogram showing commercially available IgG from Sigma.
Figure 15:
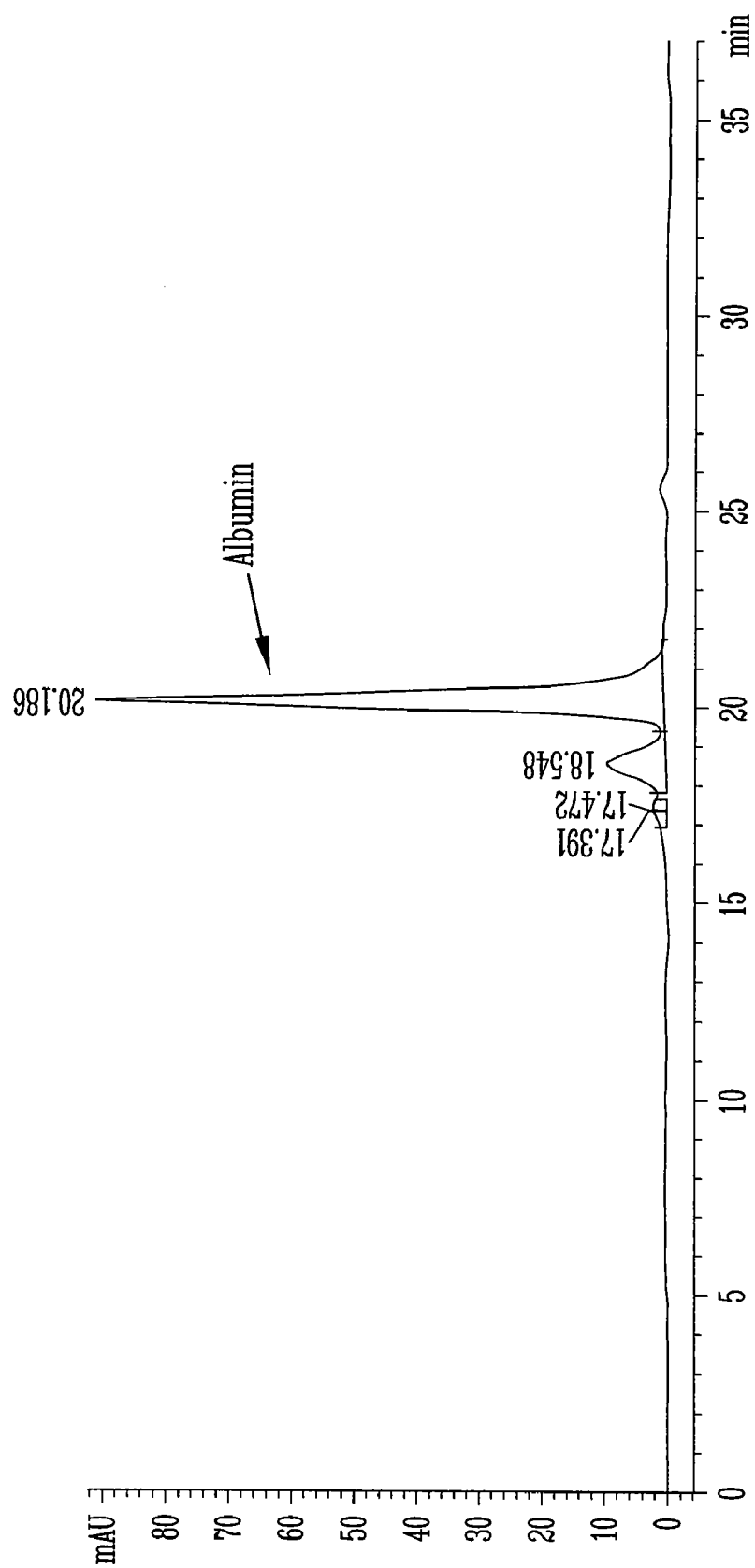
FIG. 15 is an HPLC chromatogram showing commercially available BSA (bovine serum albumin) from Fisher.
Figure 16:
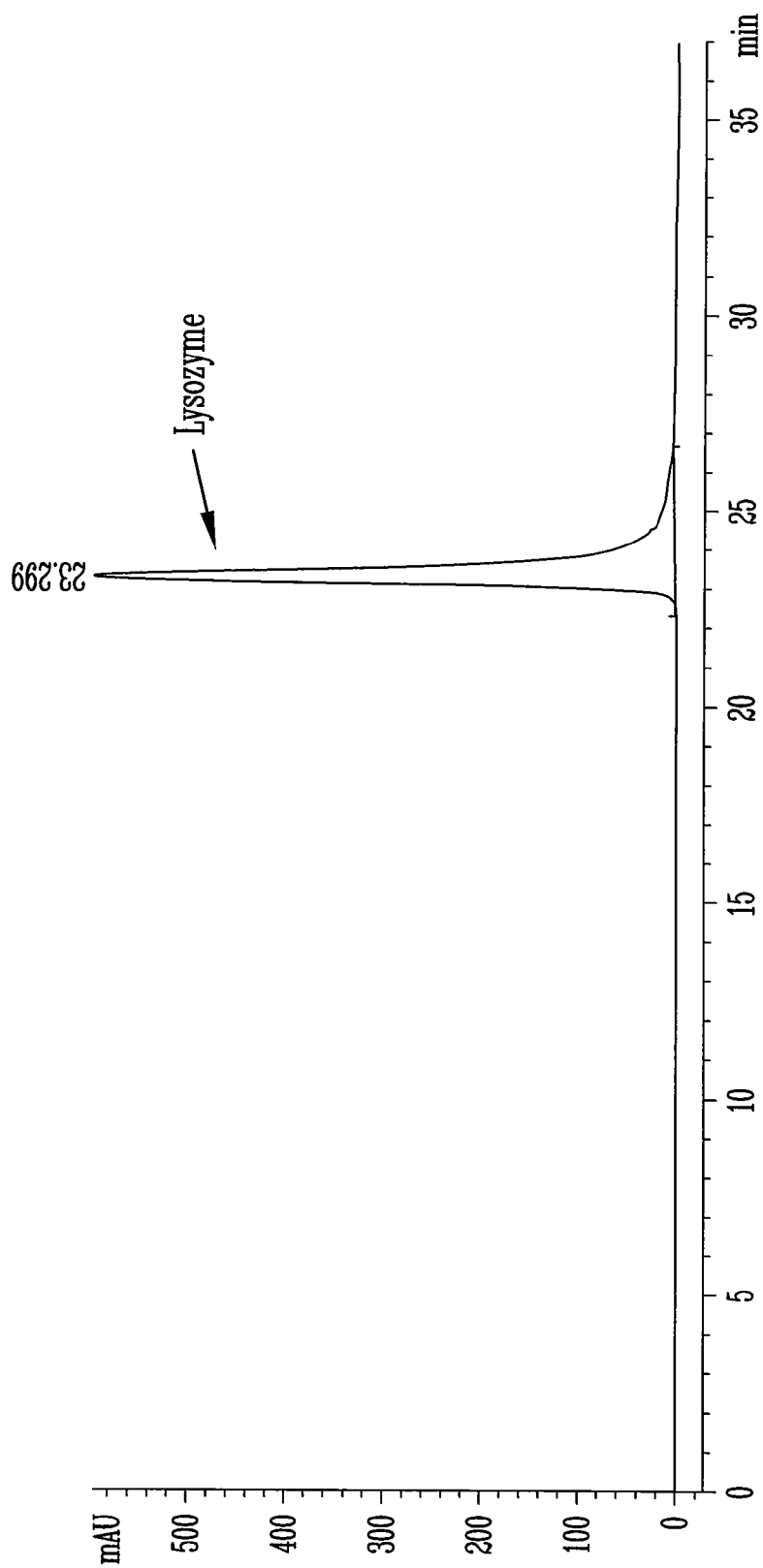
FIG. 16 is an HPLC chromatogram showing fatty acid content of commercially available lysozyme from Sigma.

Obtained from methods of the present invention, for example from the supernatant having a pH from about 2.0 to about 4.0, is a protein composition comprising TGF-beta, transfer factors, lysozyme, albumin, or ovotransferrin and the like or combinations thereof. In one embodiment, the protein composition is at least about 70%, 75%, 80%, 85%, or 90% protein per weight of composition. In one aspect, as shown in FIG. 13, the protein composition comprises albumin, ovotransferrin, and lysozyme. In one aspect, the protein composition comprises at least about 5% albumin. In one aspect, the protein composition comprises at least about 5% or 10% ovotransferrin. In one aspect, the protein composition comprises at least 70%, 75%, 80% or 85% lysozyme. In one aspect, the protein composition comprises at least about 5% albumin, and at least about 5% ovotransferrin, and at least 70% lysozyme.

In one aspect, the protein composition is substantially lipid-free. As appreciated by one ordinarily skilled in the art, the lipids can easily be removed using membranes or filters to generate a substantially lipid-free protein composition. In one aspect, the protein composition comprises processing the isolated protein or a combination of proteins of interest by freeze drying, concentrating or spray drying the protein to any suitable form. Advantageously, the method used results in a protein composition which is free from impurities. In particular, the method results in a protein composition which serves as a safe source of nutritional supplement for human consumption. Unlike other methods used for processing the egg, toxic solvents, or other unsafe materials need not be used in the methods of the invention or are not found in the resulting protein composition, e.g. the isolated egg protein, or protein composition. Accordingly, the protein composition or proteins isolated thereof may be used in any number of applications, including but not limited to products or services in the food, nutrition, and health industries. Such applications are known in the art as well as the appropriate techniques for inclusion in such application or compositions.

For example, the protein compositions of the present invention, in any suitable form, e.g. aqueous or dried, can then be applied to, admixed with and/or injected into consumable products for humans or animals, including farm animals or pets. Such consumable products include food or nutritive additives such as animal feed, human food products, nutrition supplements for humans or animals, or the like. Accordingly, a method of the present invention includes treating an animal or human in need of protein or amino acids by administering a protein composition of the present invention. The protein compositions may be administered to an animal or human to increase their protein consumption. In some cases, the animal or human may need to increase their consumption of amino acids or proteins, such as an athlete, body-builder, weight-lifter, pregnant individual, individual recovering from surgery, trauma, or illness, or a diabetic individual.

Animal feed and products according to the invention, e.g., dry food pellets and treats, will be designed such that they contain appropriate nutrition levels for the particular animal, e.g., a dog or cow. In this regard, the design of food formulations for humans, e.g. body-builders, particular animals, e.g., dog or cow, etc., is well known and established. There exist accepted nutritional guidelines for optimal amounts of proteins, fats, vitamins, minerals, fibers, that vary dependent upon whether the consumer is a human or particular animal and the consumer's age and health. It is anticipated that the protein compositions of the present invention can be added or incorporated to any animal or human drink, beverage, feed, food, product or supplement.

C. Adjusting the pH to about 4.0 to 6.0 to Facilitate the Separation of Proteins Released from the Cross-Linked Lipids In one embodiment of the present invention, the method includes facilitating the separation of proteins associated with the cross-linked lipids from the cross-linked lipids by contacting the released proteins and/or the cross-linked lipids with a solution having a pH from about 4.0 to about 6.0. Such proteins include but are not limited to lysozyme, albumin, ovotransferrin, TGF-beta or transfer factors or the like or combinations thereof. Without wishing to be bound by this theory, it is believed that the change in pH to about 4.0 to about 6.0 aids in the released proteins' solubility, thereby further facilitating the separation of proteins associated with the cross-linked lipids. According to the methods of the present invention, the step of contacting the released proteins or the cross-linked lipids or combinations thereof with a solution having a pH from about 4.0 to about 6.0 may be performed after any number of steps, depending on the proteins that are desired to be separated. In one embodiment, subsequent to contacting the cross-linked lipids with the saline solution as described elsewhere herein, the released proteins or the cross-linked lipids or combinations thereof are contacted with a solution that has a pH from about 4.0 to about 6.0. In one embodiment, subsequent to contacting the cross-linked lipids with the solution having a pH from about 2.0 to 4.0 as described elsewhere herein, the released proteins or the cross-linked lipids or combinations thereof are contacted with a solution that has a pH from about 4.0 to about 6.0. In one embodiment, subsequent to contacting the egg mixture that has its pH optimized for cross-linking of the lipids as described elsewhere herein, the released proteins or the cross-linked lipids or combinations thereof are contacted with a solution that has a pH from about 4.0 to about 6.0. As apparent to one ordinarily skilled, the pH ranges of the various solutions or mixtures, e.g. the saline solution, the solution with a pH from about 2.0 to about 4.0, or the egg mixture having a pH adjusted to a pH optimized for lipid cross-linking, may be treated with an appropriate solution to adjust the pH range of the solutions or mixtures to a pH of from about 4.0 to about 6.0. A person skilled in the art may appropriately select the temperature, the amount of the acid or base to be used, and the period of time sufficient to release to the proteins associated with the cross-linked lipids. An example of typical conditions includes carrying out the separation reaction under conditions of a pH from about 4.0 to about 6.0, more preferably from about 4.5 to 5.0, for about 15 minutes to about 1 hour, preferably from about 30 minutes to about 1 hour, at room temperature. Stirring or mixing may be employed to facilitate their separation or solubility. Non-limiting examples of suitable acids and bases include acetic acid, carbonic acid, oxalic, phosphoric, chloroacetic, citric, formic, benzoic, succinic, propionic, hydrochloric, nitric, sulfuric, hydrotropic, hydrologic, perchloric, chloric, phosphoric, sulfurous acids, sodium hydroxide or potassium hydroxide.

In one aspect, the released proteins in the acidic solution may be subjected to a basic solution to achieve a pH range of the solution from about 4.0 to about 6.0, preferably from about 4.5 to about 5.0, to solubilize proteins. The released proteins may be isolated prior to contact with the basic solution or the pH of the solution they are in may be adjusted to a pH from about 4.0 to about 6.0.

In one aspect of the invention, the proteins are obtained from a supernatant prepared by centrifuging the solution having a pH range from about 4.0 to about 6.0 and by employing standard techniques, such as concentrating the proteins and dialyzing the concentrated proteins. Dialyzing has the added benefit of removing the salt (ash). In one aspect, the supernatant may be filtered through one or more membranes of a suitable size to isolate specific proteins, such as lysozyme, albumin, ovotransferrin, TGF-beta and transfer factors or the like or combinations thereof. In another aspect, proteins may be isolated according to the methods of the present invention, for example, based in part on the proteins molecular weight. In one aspect, proteins that have a known molecular weight may be isolated using a membrane or a series of membranes that have the appropriate molecular cut off for isolating the particular protein or proteins of interest. Accordingly, the selection of membrane size can be used to obtain a protein or population of proteins of a particular size (molecular weight). With respect to TGF-beta, IGF and transfer factors, a membrane that has the appropriate molecular weight cutoff of at least 10 kDa, 5 kDa, and 1 kDa respectively may be employed.

In one aspect, the released proteins, such as lysozyme, albumin, ovotransferrin, TGF-beta and transfer factors or the like or combinations thereof, may be isolated from the lipids in the solution having a pH range from about 4.0 to about 6.0 using any number of standard techniques, including but not limited to dialysis, precipitation, sedimentation, centrifugation, decantation, particulate filtration, membrane filtration, such as gel filtration using a molecular sieve, temperature modification, extraction, such as liquid-liquid extraction, solvent extraction, salting out and desalting with NaCL or KCl, chromatography, such as anion exchange chromatography using a resin such as diethylaminoethyl (DEAE)-Sepharose or DIAION HPA-75 (manufactured by Mitsubishi Chemical), cation exchange chromatography using a resin such as S-Sepharose FF (manufactured by Pharmacia), hydrophobic chromatography using a resin such as butyl-Sepharose or phenyl-Sepharose, affinity chromatography, size exclusion chromatography, chemical precipitations, chromatofocusing and electrophoresis such as isoelectric focusing, and the like and combinations thereof. Accordingly, the process of the invention may also include isolating from the supernatant, retentate, permeate, precipitate, protein or lipid compositions, various proteins or other components of interest.

In another aspect, the identification of isolated proteins may be determined using routine techniques known to those ordinarily skilled in the art. Exemplary techniques include but are not limited to ELISA, Western blot analysis, 2D-PAGE (Westermeier, R.; Naven, T. *Proteomics in practice*; Wiley-VCH: Weinheim, 2002; pp 11-97) and automated spot identification by matrix-assisted laser desorption-ionization mass spectrometry (MALDI-MA) or liquid chromatography electrospray ionization mass spectrometry (LC-ESI MS) (Dass, C. Structural Analysis of Proteins. In *Principles and practice of biological mass spectrometry*; Dass, C., Ed.; Wiley-Interscience: New York, 2001; pp 75-216).

If desired, the isolated protein or population of proteins may be further purified, using for example, dialysis and/or chromatography, or sequential chromatographies, of anion- or cation exchange column chromatography using a resin of DEAE or CM, affinity chromatography using a gel of heparin, biotin, hydroxyapatite, hydrophobic chromatography using a gel of methyl HIC or t-butyl HIC. See for example, Awade, A. C. On hen egg fractionation: application of liquid chromatography to the isolation and purification of hen egg white and egg yolk proteins. Z. Lebensm.-Unters.-Forsch. (1996). 202: 1-14, herein incorporated by reference in its entirety. Dialyzing has the added benefit of removing the ash (or salt). The proteins may be isolated or purified for use in any number of applications, including protein compositions.

Obtained from methods of the present invention, e.g. the solution having a pH from about 4.0 to about 6.0, is a substantially lipid-free protein composition comprising lysozyme, albumin, ovotransferrin, TGF-beta and transfer factors or the like or combinations thereof present in the egg. In one aspect, the protein composition comprising a particular protein or a combination of proteins may be further processed by freeze drying, concentrating or spray drying the protein to any suitable form.

A protein composition may be obtained from the acidic supernatant. In one aspect, the protein composition comprises lysozyme, albumin, ovotransferrin, TGF-beta and transfer factors or the like or combinations thereof. In one aspect, as shown in FIG. 13, the protein composition comprises lysozyme, albumin, and ovotransferrin. In one aspect, the composition is at least 70%, 75%, 80%, 85% or 90% protein per weight of composition, comprises at least 5% or 10% album, at least 5% or 10% ovotransferrin, and at least 70%, 80% or 85% lysozyme. In one aspect, the protein composition is substantially lipid-free. As appreciated by one ordinarily skilled in the art, the lipids can easily be removed using membrane filtration to generate a lipid-free protein composition. In one aspect, the protein composition comprises processing the isolated protein or a combination of proteins of interest by freeze drying, concentrating or spray drying the protein to any suitable form.

Advantageously, the method used results in a protein composition which is free from impurities. In particular, the method results in a protein composition which serves as a safe source of nutritional supplement for human consumption. Unlike other methods used for processing the egg, toxic solvents, or other unsafe materials need not be used in the methods of the invention or are not found in the resulting protein composition, e.g. the isolated egg protein, or protein composition. Accordingly, the protein composition or proteins isolated thereof may be used in any number of applications, including but not limited to products or services in the food, nutrition, and health industries. Such applications are known in the art as well as the appropriate techniques for inclusion in such application or compositions.

For example, the protein compositions of the present invention, in any suitable form, e.g. aqueous or dried, can then be applied to, admixed with and/or injected into consumable products for humans or animals, including farm animals or pets. Such consumable products include food or nutritive additives such as animal feed, human food products, nutrition supplements for humans or animals, or the like. Accordingly, a method of the present invention includes treating an animal or human in need of protein or amino acids by administering a protein composition of the present invention. The protein compositions may be administered to an animal or human to increase their protein consumption. In some cases, the animal or human may need to increase their consumption of amino acids or proteins, such as an athlete, body-builder, weight-lifter, pregnant individual, individual recovering from surgery, trauma, or illness, or a diabetic individual.

Animal feed and products according to the invention, e.g., dry food pellets and treats, will be designed such that they contain appropriate nutrition levels for the particular animal, e.g., a dog or cow. In this regard, the design of food formulations for humans, e.g. body-builders, particular animals, e.g., dog or cow, etc., is well known and established. There exist accepted nutritional guidelines for optimal amounts of proteins, fats, vitamins, minerals, fibers, that vary dependent upon whether the consumer is a human or particular animal and the consumer's age and health. It is anticipated that the protein compositions of the present invention can be added or incorporated to any animal or human drink, beverage, feed, food, product or supplement.

V. Separating the Triglycerides, Cholesterol, Phospholipids, Lipoproteins, Fatty Acids from the Cross-Linked Lipids In an embodiment of the present invention, the method includes separating a white lipid extract comprising triglycerides, cholesterol, phospholipids, lipoproteins, such as HDL (alpha lipovitellin), LDL (beta-lipovitellin), VLDL (apovitellenin), and fatty acids, such as sialic acid, Arachadonic acid or the like or combinations thereof from the cross-linked lipids by contacting the cross-linked lipids with an acidic solution having a pH range from about 2.0 to about 4.0. Without wishing to be bound by this theory it is believed that an acidic solution with a pH from about 2.0 to about 4.0 facilitates the separation of triglycerides, cholesterol, phospholipids, lipoproteins, such as HDL (alpha lipovitellin), LDL (beta-lipovitellin), VLDL (apovitellenin), and fatty acids, such as sialic acid, Arachadonic acid or the like or combinations thereof from the cross-linked lipids into the acidic solution. In some embodiments, the cross-linked lipids are exposed to a solution that has a pH from about 2.0 to about 4.0 subsequent to exposing the cross-linked lipids to the saline solution described above or subsequent to the initial step of cross-linking the lipids.

In an embodiment of the invention, the separated cross-linked lipids suspended in solution, e.g. the egg mixture, may be treated with an appropriate solution to adjust the pH range of the cross-linked lipids-solution to a pH value of from about 2.0 to about 4.0, preferably from a pH from about 2.5 to about 3.0. In an embodiment of the invention, as shown in FIG. 3, the method includes resuspending a precipitate of the cross-linked lipids in an acidic solution that has a pH from about 2.0 to about 4.0, preferably from a pH from about 2.5 to about 3.0. A person skilled in the art may appropriately select the temperature, the amount of the acid or base to be used, and the period of time sufficient to release or solubilize to the components, e.g. fatty acids, associated with the cross-linked lipids. An example of typical conditions includes carrying out the separation reaction under acidic conditions of a pH from about 2.0 to about 4.0 for about 10 minutes to about 1 hour at a temperature of about 14° C. to about 32° C. Stirring or mixing may be employed to facilitate their release. Non-limiting examples of suitable acids suitable for adjusting the pH include acetic acid, carbonic acid, oxalic, phosphoric, chloroacetic, citric, formic, benzoic, succinic, propionic, hydrochloric, nitric, sulfuric, hydrotropic, hydrologic, perchloric, chloric, phosphoric, and sulfurous acids or combinations thereof.

In one embodiment of the present invention, the method includes facilitating the separation of a white lipid extract comprising triglycerides, cholesterol, phospholipids, lipoproteins, such as HDL (alpha lipovitellin), LDL (beta-lipovitellin), VLDL (apovitellenin), and fatty acids, such as sialic acid, Arachadonic acid or the like or combinations thereof from the cross-linked lipids by adjusting the pH of the solution from about 2.0 to about 4.0 to a pH from about 4.0 to about 6.0, more preferably from about 4.5 to about 5.0. Without wishing to be bound by this theory, it is believed that the change in pH to about 4.0 to about 6.0 aids in the separation of a white lipid extract from the cross-linked lipids. As apparent to one ordinarily skilled, the pH ranges of the various solutions, e.g. the solution with a pH from about 2.0 to about 4.0 may be treated with an appropriate solution to adjust the pH range of the solution to a pH of from about 4.0 to about 6.0. A person skilled in the art may appropriately select the temperature, the amount of the acid or base to be used, and the period of time sufficient to release to the proteins associated with the cross-linked lipids.

Figure 9:
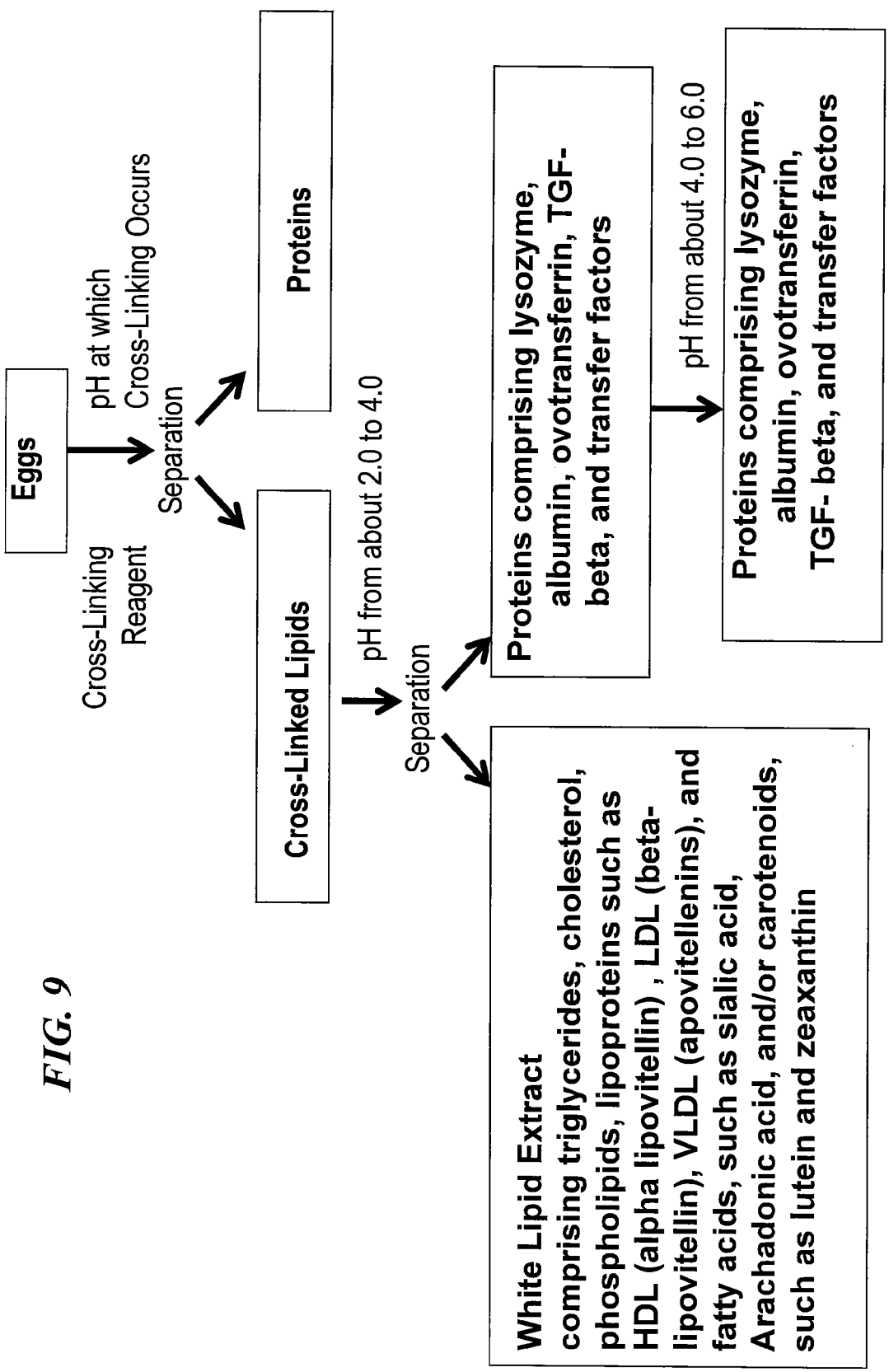
FIG. 9 is a flow chart for another embodiment of separating from cross-linked lipids of an egg, proteins typically associated with lipids from an egg. Components that typically remain associated with the cross-linked lipids are also shown.
Figure 11:
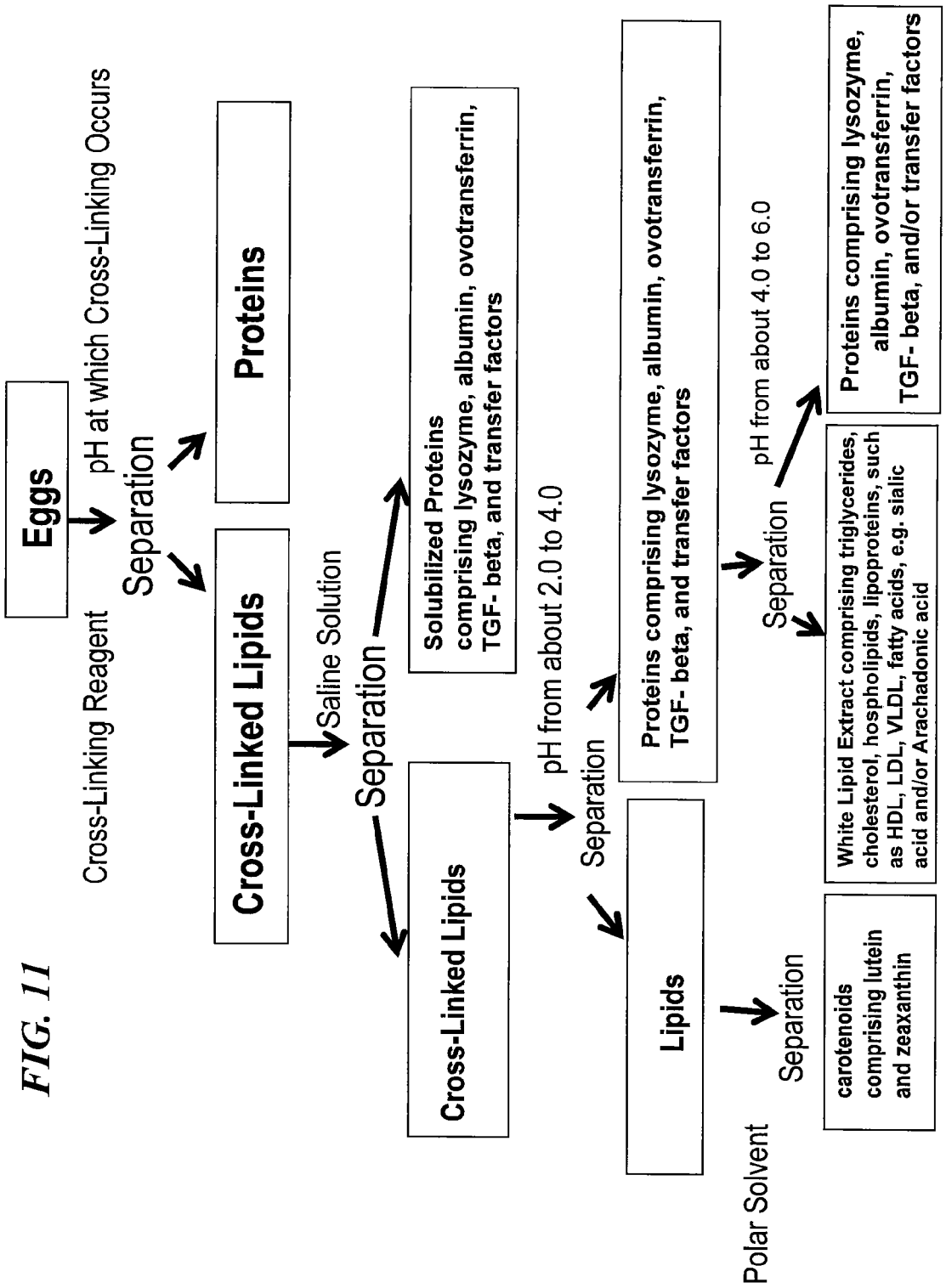
FIG. 11 is a flow chart for one embodiment of separating from cross-linked lipids of an egg, proteins of various sizes, lipoproteins, fatty-acids, and carotenoids or combinations thereof.

According to the invention, the white lipid extract may be isolated from an acidic solution having a pH from about 2.0 to 4.0 as shown in FIG. 9, or a basic solution as shown in FIG. 11, using standard techniques, such as such as precipitation, sedimentation, centrifugation, decantation, particulate filtration, membrane filtration, temperature modification, liquid-liquid extraction, and the like and combinations thereof.

In one aspect of the invention, as shown in FIG. 11, the method includes centrifuging the solution having a pH from about 4.0 to about 6.0, more preferably having a pH from about 4.5 to about 5.0, to generate a supernatant comprising solubilized proteins as described elsewhere herein and a precipitate comprising lipids, referred to herein as a white lipid due to its color. In one aspect, the white lipid may be transferred to a liquid or solution to form an extract. The white lipid may be resuspended into any suitable solution that does not destroy the lipids depending on the intended purpose for the white lipid extract or triglycerides, cholesterol, phospholipids, lipoproteins, such as HDL (alpha lipovitellin), LDL (beta-lipovitellin), VLDL (apovitellenin), and fatty acids, such as sialic acid, Arachadonic acid or the like isolated therefrom. As an example, the fatty acids may be solubilized into any suitable solution for further use in any number of applications. In one aspect, the white lipid is resuspended into a basic solution, for example, an approximately 5% NaOH solution with a pH from about 9.5 to about 10.5 to solubilize the fatty acids into the basic solution. In one aspect, the white lipid is resuspended into an acidic solution, for example, an approximately 10% acetic acid with a pH from about 2.5 to about 3.5 to solubilize the fatty acids into the basic solution. The use of an acid solution also has the added benefit of being an anti-microbial, which, therefore, also makes it a good choice for a storage solution. In particular, an acetic acid solution advantageously has been shown to stabilize lipids. Alternately, the white lipid may be resuspended into a solution that has a neutral pH, for example, one that is suitable for cosmetic purposes.

Obtained is a white lipid extract composition or precipitate comprising triglycerides, cholesterol, phospholipids, lipoproteins such as HDL (alpha lipovitellin), LDL (beta-lipovitellin), VLDL (apovitellenins), and fatty acids, such as sialic acid, Arachadonic acid or the like or combinations thereof. The white lipid extract, white lipid precipitate, or triglycerides, cholesterol, phospholipids, lipoproteins such as HDL (alpha lipovitellin), LDL (beta-lipovitellin), VLDL (apovitellenins), and fatty acids, such as sialic acid, Arachadonic acid or the like or combinations thereof isolated therefrom may be used in any number of applications, including but not limited to products or services in the food, nutrition, and health industries. Such applications are known in the art as well as the appropriate techniques for inclusion in such application or compositions.

VI. Separating the Carotenoids from the Cross-Linked Lipids

In an embodiment of the present invention, the method includes separating carotenoids, such as lutein and zeaxanthin, from the cross-linked lipids. According to the invention, the method includes separating the cross-linked lipids comprising carotenoids from an acidic solution with a pH from about 2.0 to about 4.0, preferably from an acidic solution with from about 2.5 to about 3.0. In one aspect, the separation may be accomplished by standard techniques, including but not limited to precipitation, sedimentation, centrifugation, decantation, particulate filtration, membrane filtration, chromatography, and the like and combinations thereof. In one aspect, the carotenoids are obtained by centrifuging the cross-linked lipids from the acidic solution to obtain a precipitate.

Figure 10:
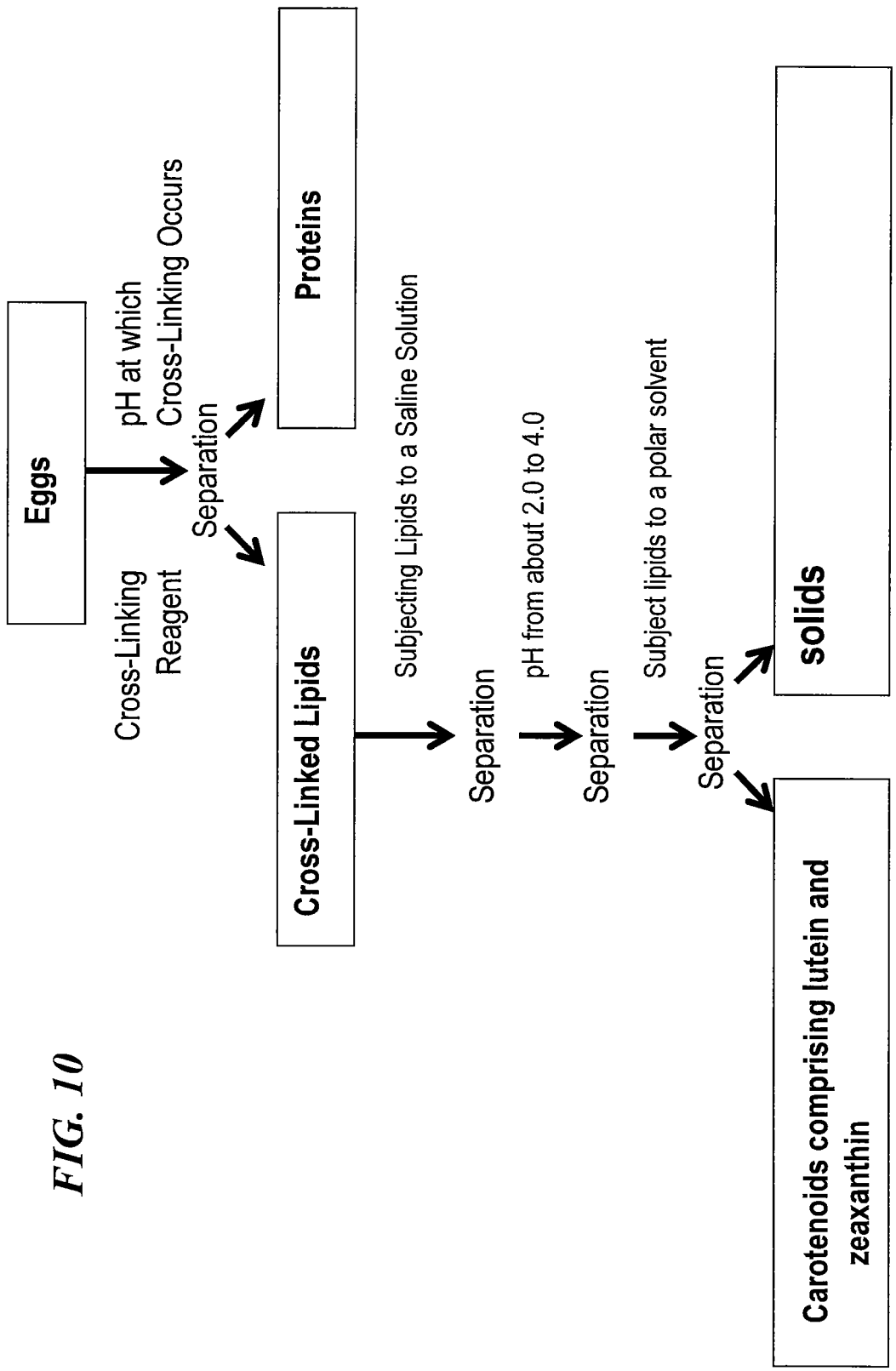
FIG. 10 is a flow chart for one embodiment of separating from cross-linked lipids of an egg, carotenoids.

In some embodiments, the cross-linked lipids are contacted with a solution that has a pH from about 2.0 to about 4.0 subsequent to contacting the cross-linked lipids with the saline solution described above or subsequent to the initial step of cross-linking the lipids. In one aspect, the cross-linked lipids may be subjected to a saline solution as described elsewhere herein and as shown in FIGS. 10-11, prior to being subjected to an acidic solution that adjusts the pH of the saline solution to a pH from about 2.0 to about 4.0, preferably from a pH from about 2.5 to about 3.0. As appreciated by one ordinarily skilled in the art, the solution may be centrifuged to separate the cross-linked lipids comprising the carotenoids from other components, e.g. proteins released into solution at the various steps of the method.

In an embodiment of the present invention, the method includes resuspending the precipitate of cross-linked lipids comprising the carotenoids in a polar solvent to release the carotenoids from the cross-linked lipids. As used herein, the term polar solvent includes solvents that are miscible with water, including but not limited to water, an alcohol such as ethanol or methanol, caprylic acid, and the like. Any polar solvent that solubilizes any of the carotenoids in the egg may be used. The percentage of polar solvent used may be about 50-100%. Any percentage or form of polar solvent may be used so long as it is able to solubilize one or more of the carotenoids, such as lutein and zeaxanthin or combinations thereof into the solvent. A person skilled in the art may appropriately select the temperature, the percent of the solvent to be used, and the period of time sufficient to release to the carotenoids from the cross-linked lipids. An example of typical conditions includes carrying out the separation reaction for about 30 minutes to about 1 hour at a room temperature. Mixing or stirring of the precipitate of cross-linked lipids comprising the carotenoids in the solvent may facilitate the release or solubility of the carotenoids.

In an embodiment of the present invention, the method includes separating from the polar solvent carotenoids, for example, lutein, zeaxanthin and the like, or combinations thereof. The carotenoids, including but not limited to luteins and zeaxanthins, may be separated from the polar solvent using any suitable technique. The carotenoids may be separated from the solvent by centrifuging the resuspended precipitate/polar solvent mixture to obtain a supernatant and extracting the colorful carotenoids therefrom. Such techniques are well within the knowledge of one ordinarily skilled in the art, see, for example, Tyzkowski and Hamilton, Poultry Sci. 70(3):651 654 (1991), and U.S. Pat. Nos. 7,173,145 and 6,909,021, herein incorporated by reference in its entirety, describing the extraction of carotenoids, such as lutein and zeaxanthin. Standard techniques that may also be used include to separate or further isolated the carotenoids include but are not limited to precipitation, sedimentation, centrifugation, decantation, solvent extraction, such as super critical fluid extraction or liquid-liquid extraction, saponification, chromatography, chemical precipitations, multiple solvents, blends of chloroform, or fatty acids, like oleic acid or caprylic acid, or mixtures thereof, temperature modification, particulate filtration, membrane filtration, chromatography, and the like or combinations thereof.

In one aspect, a carotenoid composition comprises carotenoids obtained from an egg using the methods of the present invention. In one aspect, the carotenoids comprise luteins and zeaxanthins. Advantageously, the carotenoids and carotenoids of the present invention are bioavailable since they are substantially lipid-free.

The carotenoids, carotenoid composition, and zeaxanthin or lutein thereof may be used in any number of applications, including but not limited to products or services in the food, nutrition, pharmaceutical and health industries. Such applications are known in the art as well as the appropriate techniques for inclusion in such application or compositions. Examples of carotenoids in pharmaceutical uses include, without limitation: treatment of cancer such as disclosed in U.S. Pat. No. 5,811,119 to Mehta et al.; age-related macular degeneration such as disclosed in U.S. Pat. No. 6,329,432 to Norman et al. U.S. Pat. No. 6,218,436 to Howard et al.; hypertriglyceridaemia as disclosed in U.S. Pat. No. 5,811,119 to Klor et al.; inflammatory disorders such as disclosed in U.S. Pat. No. 5,886,053 to Schmutzler et al.; and skin damage due to exposure to sunlight such as disclosed in U.S. Pat. No. 5,804,168 to Murad. Carotenoids may also be used as feed supplements for pigmenting certain parts and products of poultry, fish and crustacea, as disclosed in U.S. Pat. No. 5,605,699 to Bernhard et al., U.S. Pat. No. 5,849,345 to Giger et al., U.S. Pat. No. 7,220,874 to Cordona et al. All references mentioned are herein incorporated by reference, each in its entirety. It would be highly advantageous to have a source of feed supplement for pigmentation in poultry which can be derived from eggs, a poultry product. Carotenoids used in poultry feed is generally obtained from other sources such as marigolds. Using the process of the present invention, would allow a poultry and egg producer to have its own source of carotenoids for feed supplement and thereby decrease reliance on suppliers of feed supplements. Accordingly, in an embodiment of the present invention, the method includes feeding the carotenoids to poultry.

Therefore methods and resulting compositions related to the recovery of components from whole eggs, technical or edible eggs, yolks or whites have been disclosed. Various embodiments, alternatives, and options have been discussed throughout this disclosure. The present invention is not to be limited to specific embodiments presented herein.

We claim:

1. A method of separating protein from an egg mixture, wherein the egg mixture comprises lipids and solubilized proteins, the method comprising the steps of:
   (a) adding a cross-linking reagent to the egg mixture comprising lipids and solubilized proteins to obtain cross-linked lipids;
   (b) adjusting the pH level of the egg mixture to a pH at which the cross-linking reagent is functional so that cross-linking of lipids occurs; and
   (c) separating the proteins from the cross-linked lipids to provide a separated protein fraction.

2. The method of claim 1 wherein the suitable pH for cross-linking to occur is from about 6.0 to about 8.0.

3. The method of claim 1 wherein the egg mixture comprises a technical egg, an edible egg, an egg yolk, or an egg white, or combination thereof.

4. The method of claim 1 wherein the cross-linking reagent is selected from the group consisting of beta-cyclodextrin, silicon dioxide, colloidal silica material, fumed silica material, and synthetic calcium silicate hydrate.

5. The method of claim 4 wherein the colloidal silica material is an acid stabilized dispersion of colloidal silica particles.

6. The method of claim 4 wherein the fumed silica material is selected from the group consisting of synthetic amorphous silicon dioxide, crystalline-free fumed silica, crystalline-free precipitated silica.

7. The method of claim 1, wherein the separating step of (c) comprises dialysis, precipitation, sedimentation, centrifugation, decantation, particulate filtration, membrane filtration, temperature modification, extraction, desalting, chromatography, chemical precipitations, chromatofocusing, electrophoresis, or combinations thereof.

8. The method of claim 1, further comprising the step of centrifuging the protein fraction made in step (c) and recovering a supernatant that comprises solubilized proteins.

9. The method of claim 8 wherein separating the proteins from the supernatant is performed using membrane filtration to obtain a retentate protein mixture.

10. The method of claim 9 wherein the membrane used to recover the proteins from the supernatant has a molecular cut off weight of at least 0.8 micron.

11. The method of claim 1 wherein the proteins comprise ovotransferrin, albumin, beta-livetin (alpha-2-glycoprotein), gamma livetin (IgY), insulin-like growth factor-1 (IGF-1), or phosvitin or combinations thereof.

12. The method of claim 1, wherein the separated protein fraction comprises proteins of greater than 100 kDa in molecular weight.

13. The method of claim 12 wherein proteins greater than 100 kDa in molecular weight are separated using a membrane that has a molecular weight cutoff of at least 100 kDa to obtain a retentate protein mixture comprising proteins that are greater than 100 kDa in molecular weight and a permeate protein mixture comprising proteins that are less than 100 kDa in molecular weight.

14. The method of claim 13 further comprising separating proteins that are less than 100 kDa in molecular weight obtained from the permeate protein mixture but greater than 1 kDa in molecular weight by subjecting the permeate to a membrane that has a molecular weight cutoff of at least 1 kDa.

15. The method of claim 1, further comprising drying the separated protein.

16. The method of claim 15, wherein the drying step is selected from the group consisting of spray-drying, freeze-drying, spray-freeze drying, paddle-drying, drum drying, lyophilization, vacuum drying, or air drying.

* * * * *